United States Patent
Chen et al.

(10) Patent No.: US 12,058,603 B2
(45) Date of Patent: Aug. 6, 2024

(54) SYSTEMS AND METHODS FOR PREVENTING UNDESIRED ACCESS BARRING ALLEVIATION

(71) Applicant: GOOGLE LLC, Mountain View, CA (US)

(72) Inventors: Teming Chen, Taoyuan (TW); Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 341 days.

(21) Appl. No.: 17/635,227

(22) PCT Filed: Aug. 14, 2020

(86) PCT No.: PCT/US2020/046306
§ 371 (c)(1),
(2) Date: Feb. 14, 2022

(87) PCT Pub. No.: WO2021/030658
PCT Pub. Date: Feb. 18, 2021

(65) Prior Publication Data
US 2022/0295378 A1  Sep. 15, 2022

Related U.S. Application Data

(60) Provisional application No. 62/886,903, filed on Aug. 14, 2019.

(51) Int. Cl.
*H04W 48/02* (2009.01)
*H04W 48/10* (2009.01)

(52) U.S. Cl.
CPC ........... *H04W 48/02* (2013.01); *H04W 48/10* (2013.01)

(58) Field of Classification Search
CPC .............................. H04W 48/02; H04W 48/10
See application file for complete search history.

(56) References Cited

U.S. PATENT DOCUMENTS 10,306,696 B2 *  5/2019  Lee ..................... H04W 48/16
10,911,943 B2 *  2/2021  Chou .................... H04W 48/12
(Continued)

FOREIGN PATENT DOCUMENTS

CN   103857008 A   6/2014
EP    2219411 A1   8/2010
(Continued)

OTHER PUBLICATIONS

First Office Action for Chinese Application No. 202080066204.9, dated Sep. 16, 2023.
ITRI, "Discussion on EAB Requirement and Procedure", 3GPP TSG RAN2 Meeting #77bis, Mar. 26-30, 2012, 3 pages.
(Continued)

*Primary Examiner* — Adam D Houston
(74) *Attorney, Agent, or Firm* — MARSHALL, GERSTEIN & BORUN LLP

(57) ABSTRACT

A method for avoiding undesired message transmissions from a user device to a RAN is implemented in a user device. The method includes receiving (202 or 302), from the RAN, a first value of the barring factor, and determining (206 and 210 or 306 and 310), based on a first probability corresponding to the first value, that access barring applies to a message transmission. The method also includes suspending (214 or 314) the message transmission while running a first timer (216 or 316) and, after the first timer expires or stops, either (1) if the first value does not correspond to a maximum probability of the different probabilities, determining (222 or 322) that the access barring is alleviated, or (2) if the first value corresponds to the maximum probability, continuing to suspend (224 or 326) the message transmission.

22 Claims, 15 Drawing Sheets

(56) References Cited

U.S. PATENT DOCUMENTS

| | | |
|---|---|---|
| 11,044,758 B2 * | 6/2021 | Lee .................. H04J 11/00 |
| 11,388,650 B2 * | 7/2022 | Li .................... H04W 28/06 |
| 2010/0184448 A1 | 7/2010 | Wu |
| 2011/0230183 A1 * | 9/2011 | Tanaka ............. H04W 76/19 |
| | | 455/423 |
| 2011/0250880 A1 * | 10/2011 | Olsson ............. H04W 76/18 |
| | | 455/423 |
| 2014/0213277 A1 | 7/2014 | Jang |
| 2016/0205630 A1 | 7/2016 | Chen et al. |
| 2018/0199273 A1 | 7/2018 | Chun |
| 2018/0279204 A1 | 9/2018 | Kim et al. |
| 2018/0324675 A1 | 11/2018 | Lee |
| 2018/0324866 A1 * | 11/2018 | Lee .................. H04W 76/27 |
| 2019/0150071 A1 * | 5/2019 | Lee .................... H04W 4/06 |
| | | 370/328 |
| 2019/0223081 A1 | 7/2019 | Cheng |
| 2020/0052963 A1 * | 2/2020 | Kim .................. H04W 76/10 |
| 2021/0227451 A1 * | 7/2021 | Babaei ............. H04W 48/12 |
| 2022/0303883 A1 * | 9/2022 | Gao .................. H04W 48/16 |
| 2022/0312184 A1 * | 9/2022 | Gummadi .......... H04W 48/02 |
| 2024/0056945 A1 * | 2/2024 | Hegde ............... H04W 48/02 |

FOREIGN PATENT DOCUMENTS

| | | | |
|---|---|---|---|
| KR | 102375019 B1 * | 3/2022 | |
| WO | WO-2021242243 A1 * | 12/2021 | ............ H04W 48/02 |
| WO | WO-2023014948 A1 * | 2/2023 | |

OTHER PUBLICATIONS

Google Inc, "Discussion on UE Behaviours for Access Barring Alleviation", 3GPP TSG-RAN WG2 Meeting #107, R2-1916078, Nov. 18-22, 2019, 9 pages.

Search Report and Written Opinion in International Application No. PCT/US2020/046306 dated Nov. 12, 2020, 16 pages.

"3rd Generation Partnership Project; Technical Specification Group Radio Access Network; NR; Radio Resource Control (RRC) protocol specification (Release 15)" 3GPP (Jun. 2019).

"LTE; Evolved Universal Terrestrial Radio Access (E-UTRA); Radio Resource Control (RRC); Protocol Specification," 3GPP TS 36.331 version 15.6.0 Release 15 (Jul. 2019).

"LTE; Evolved Universal Terrestrial Radio Access (E-UTRA); Radio Resource Control (RRC); Protocol Specification," 3GPP TS 36.331 version 9.13.0 Release 9 (Feb. 2013).

* cited by examiner

SYSTEMS AND METHODS FOR PREVENTING UNDESIRED ACCESS BARRING ALLEVIATION

FIELD OF THE DISCLOSURE

This disclosure relates generally to wireless communications and, more particularly, to applying access control to message transmissions (e.g., messages associated with a specific access category).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To address network congestion more efficiently, a network, and user equipment units (UEs) in communication with the network, can implement an access control mechanism. For example, the 3GPP specification (e.g., TS 38.331 v15.6.0 or TS 36.331 v15.6.0) defines a so-called Unified Access Control (UAC) mechanism for 5G new radio (NR) systems.

According to the UAC, the network (e.g., the 5G core network, or "5GC," of the overall network) at some point determines that the congestion has reached a certain level and selects one or more "access categories" for which the network should initiate access control to temporarily reduce traffic. A radio access network (RAN) broadcasts an indication of the selected access category to UEs. Examples of access categories include emergency sessions, mobile-originated voice calls, mobile-originated video calls, mobile-terminated voice calls, mobile-terminated video calls, delay-tolerant sessions, etc.

Generally speaking, the UAC operates in a probabilistic, rather than deterministic, manner to reduce traffic for a particular access category. To limit traffic for the access category (i.e., messages associated with the access category), base stations of the RAN broadcast a value of a barring factor specific to the access category in a system information block (SIB). The UAC barring factor (uac-BarringFactor) can have a value between "p00" and "p95", where "p00" corresponds to a 0% probability of access (i.e., a 100% probability of access barring), "p05" corresponds to a 5% probability of access, and so on, up to a 95% probability of access for "p95".

After receiving the broadcast value of uac-BarringFactor, a UE deciding to transmit a message in the relevant access category performs an access barring check ("UAC check") by generating a random number between 0 and 1 based on a uniform probability distribution, and comparing the random number to the value of uac-BarringFactor. The UE can immediately transmit the message to the RAN if the random number is less than the broadcast value. Thus, the network can statistically reduce the number of instances in which UEs transmit data in a particular access category by raising or lowering the value of uac-BarringFactor for that access category.

In addition to the uac-BarringFactor, the SIB can include a parameter (uac-BarringTime) that the UE can use, along with a randomly generated number, to derive a timer value/duration. If a UE performs an access barring check and determines that access barring applies (i.e., if the generated random number is greater than or equal to the value of uac-BarringFactor), the UE starts a timer having the value/duration derived from the uac-BarringTime parameter, and suspends the message transmission while the timer is running. When the timer expires, the UE determines that the access barring is alleviated for the access category. The UE can then consider whether the message transmission is still needed and, if so, transmit the message to the RAN.

This timer-based technique can avoid the harsh result of a UE being unable to ever transmit a message in a particular access category simply because the UE failed to generate a random number less than the value of uac-BarringFactor. However, the technique also has drawbacks. In particular, because a given UE considers access barring to be alleviated when the timer expires, the UE might ultimately transmit one or more messages in an access category for which the network has set the value of uac-BarringFactor to zero ("p00"). That is, the UE might transmit (after a timer delay) one or more messages in a particular access category even when the network intended to rule out any possibility of such a transmission. Thus, the network loses the flexibility to completely and selectively shut down UE message transmissions for specific access categories, which in turn can cause the network to manage network congestion less efficiently.

SUMMARY

The techniques of this disclosure concern wireless communication systems in which the network controls the amount of user device network access via a barring factor (e.g., in 5G NR or eLTE, the parameter uac-BarringFactor). The barring factor can have any one of multiple values, corresponding to different probabilities that a given user device will be barred from transmitting at least some messages (e.g., messages in a particular access category) to the RAN. In this disclosure, any reference to different actions (e.g., receiving, transmitting, etc.) being performed by a "RAN" may indicate that the actions are performed by only a single base station of the RAN, or by two or more base stations of the RAN, depending on the implementation and/or scenario. If a user device receives two barring factor values from a RAN, for example, the same base station may have broadcast both values, or a different base station may have broadcast each value (e.g., if the user device traveled from one cell to another between the two broadcasts).

Generally, the techniques of this disclosure enable a network to more reliably and/or more comprehensively bar user devices from accessing the RAN (e.g., for specific access categories). In particular, with these techniques, user devices can avoid circumventing the purpose of the access barring in scenarios where the network sets the barring factor to a value that maximizes the barring probability (e.g., a value corresponding to a 100% probability of barring, as in the case of the "p00" value for 5G NR or eLTE).

In some techniques of this disclosure, a user device achieves this at least in part by taking different actions based on whether the barring factor value corresponds to the maximum probability of access barring (e.g., 100%). In one such technique, for example, when a user device determines that access barring applies to a message transmission (e.g., by comparing a randomly generated number to a probability indicated by the barring factor value), and after expiration of a barring timer, the user device determines that access barring is alleviated only if the value of the barring factor does not correspond to the maximum barring probability (e.g., for 5G NR, if the value instead falls in the range "p05"

to "p95"). If the value of the barring factor does correspond to the maximum barring probability (e.g., for 5G NR, if the value is "p00"), the user device continues to suspend the message transmission. For example, the user device may continue to suspend the message transmission until the timer expires a second time, until a different timer expires, or until a predefined event occurs (e.g., the user device entering a particular state, selecting or reselecting a cell, receiving a new value of the barring factor from the RAN, etc.). Thus, if the current barring factor value corresponds to the maximum barring probability, the user device cannot transmit the message simply because a barring timer has expired or stopped.

In another one of these techniques, when a user device determines that access barring applies to a message transmission (e.g., using the barring factor value and a randomly generated number as described above), the user device only starts the barring timer if the value of the barring factor does not correspond to the maximum barring probability. If the value of the barring factor does correspond to the maximum barring probability, the user device either denies the message transmission (e.g., sets a timer to an infinite value), or suspends the message transmission at least until a predefined event occurs (e.g., the user device entering a particular state, selecting or reselecting a cell, receiving a new value of the barring factor, etc.). Again, therefore, if the current barring factor value corresponds to the maximum barring probability, the user device cannot transmit the message simply because a barring timer has expired or stopped.

In still another one of these techniques, the user device only performs an access barring check if the value of the barring factor does not correspond to the maximum barring probability. If the barring factor value does correspond to the maximum barring probability, the user device denies the message transmission (e.g., sets a timer to an infinite value). As in the previous techniques, therefore, if the current barring factor value corresponds to the maximum barring probability, the user device cannot transmit the message simply because a barring timer has expired or stopped.

In an alternative technique, the user device does not necessarily condition any operations on whether the value of the barring factor corresponds to the maximum barring probability. In this technique, when the user device determines that a message is ready for transmission to the RAN, the user device performs an access barring check (e.g., using the barring factor value and a randomly generated number as described above). If access barring applies, the user device suspends the message transmission while running a timer. After the timer expires, the user device performs a second access barring check (i.e., uses the same barring factor value, or another barring factor value subsequently received from the RAN, to determine whether the access barring still applies). In some implementations, the user device repeats this process indefinitely, with the user device performing another access barring check after each timer expiration, until one such check indicates that access barring does not apply. Thus, as long as the barring factor value continues to indicate (in some implementations) a 100% probability of access barring, the user device does not consider access barring to be alleviated, and therefore does not transmit the message.

One example implementation of these techniques is a method, in a user device, for avoiding undesired message transmissions from the user device to a RAN. The RAN is configured to transmit a barring factor with any one of a plurality of values, and the plurality of values correspond to different probabilities that the user device will be barred from transmitting at least some messages to the RAN. The method includes receiving, from the RAN, a first value of the barring factor, and determining, by processing hardware of the user device and based on a first probability corresponding to the first value, that access barring applies to a message transmission. The method also includes suspending, by the processing hardware, the message transmission while running a first timer, and after expiration of the first timer, and by the processing hardware, either (1) if the first value does not correspond to a maximum probability of the different probabilities, determining that the access barring is alleviated, or (2) if the first value corresponds to the maximum probability, continuing to suspend the message transmission.

Another example implementation of these techniques is another method, in a user device, for avoiding undesired message transmissions from the user device to a RAN. The RAN is configured to transmit a barring factor with any one of a plurality of values, and the plurality of values correspond to different probabilities that the user device will be barred from transmitting at least some messages to the RAN. The method includes receiving, from the RAN, a first value of the barring factor, and determining, by processing hardware of the user device and based on a first probability corresponding to the first value, that access barring applies to a message transmission. The method also includes, after determining that the access barring applies to the message transmission, and by the processing hardware, either (1) if the first value does not correspond to a maximum probability of the different probabilities, (i) suspending the message transmission while running a first timer, and (ii) determining that the access barring is alleviated after expiration of the first timer, or (2) if the first value corresponds to the maximum probability, either (i) denying the message transmission, or (ii) suspending the message transmission at least until an occurrence of at least one event in a set of one or more predefined events.

Another example implementation of these techniques is another method, in a user device, for avoiding undesired message transmissions from the user device to a RAN. The RAN is configured to transmit a barring factor with any one of a plurality of values, and the plurality of values correspond to different probabilities that the user device will be barred from transmitting at least some messages to the RAN. The method includes receiving, from the RAN, a first value of the barring factor, and determining, by processing hardware of the user device, whether the first value corresponds to a maximum probability of the different probabilities. The method also includes, by the processing hardware, either (1) if the first value does not correspond to the maximum probability, determining, based on a first probability corresponding to the first value, whether temporary access barring applies to a message transmission, or (2) if the first value corresponds to the maximum probability, denying the message transmission.

Another example implementation of these techniques is another method, in a user device, for avoiding undesired message transmissions from the user device to a RAN. The RAN is configured to transmit a barring factor with any one of a plurality of values, and the plurality of values correspond to different probabilities that the user device will be barred from transmitting at least some messages to the RAN. The method includes receiving, from the RAN, a first value of the barring factor, and determining, by processing hardware of the user device and based on a first probability corresponding to the first value, that access barring applies to a message transmission. The method also includes suspending, by the processing hardware, the message transmission while running a first timer, and after expiration of the first timer, determining, by the processing hardware, that the message transmission is still needed. The method also includes, in response to determining that the message transmission is still needed, determining, by the processing hardware and based on either (i) the first probability or (ii) a second probability corresponding to a second value of the barring factor received from the RAN, whether the access barring still applies to the message transmission.

DETAILED DESCRIPTION OF THE DRAWINGS

Figure 1:
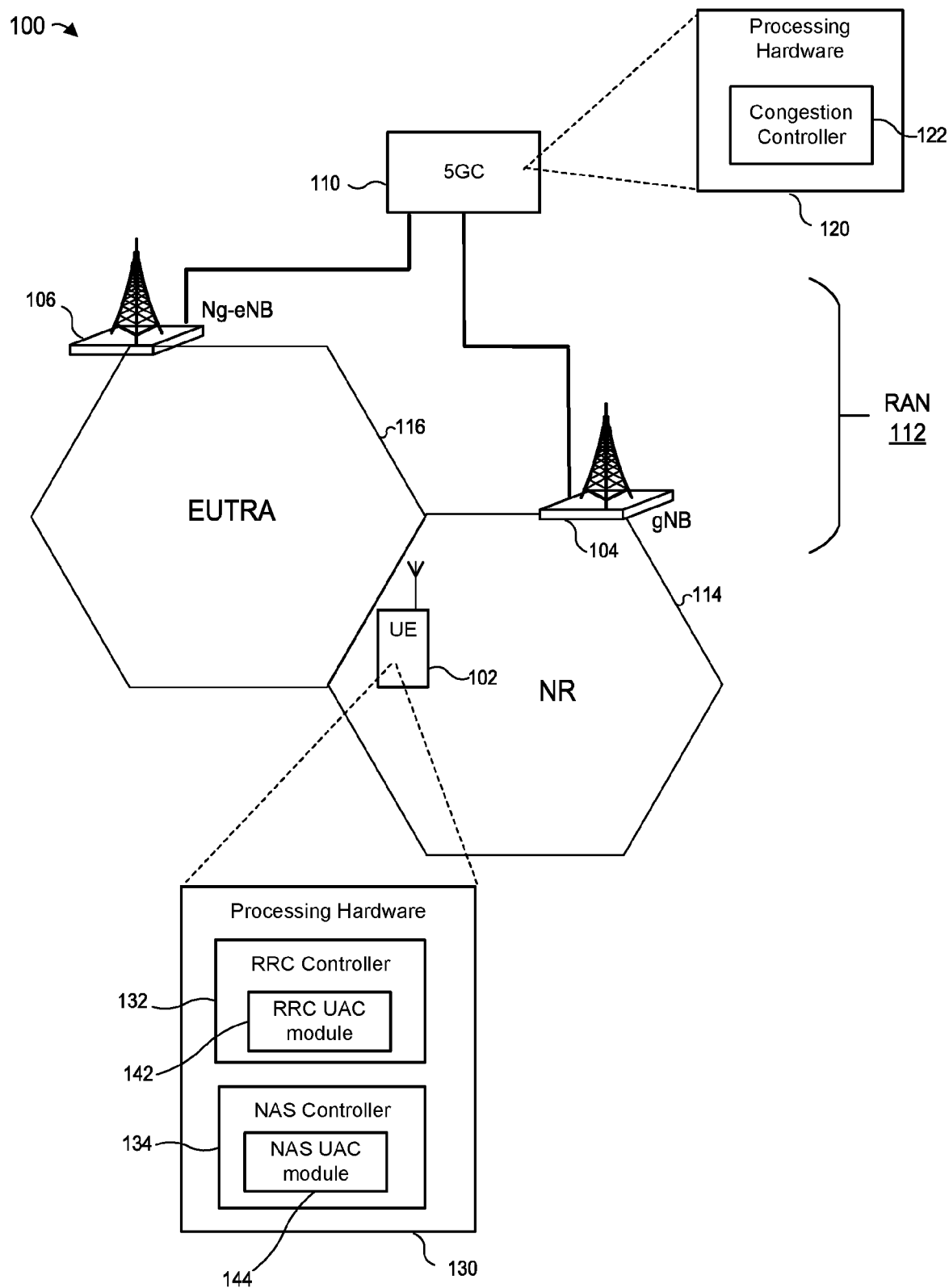
FIG. 1 is a block diagram of an example wireless communication network in which a user device can utilize access control techniques of this disclosure.

FIG. 1 depicts an example wireless communication system 100 that can implement access control mechanisms of this disclosure. The wireless communication system 100 in this example configuration includes a UE 102, and also includes base stations 104, 106 connected to a 5G core network (5GC) 110. Each of the base stations 104, 106 may operate as a node in a RAN 112, and supports a respective cell 114, 116. While FIG. 1 shows base station 104 as a 5G Node B (gNB) operating in an NR cell 114 and base station 106 as a next-generation evolved Nodes B (ng-eNB) operating in an Evolved Universal Terrestrial Radio Access (EUTRA) cell 116, the RAN 112 can include any suitable number of gNBs supporting NR cells, and/or ng-eNBs supporting EUTRA cells. While shown as non-overlapping areas in FIG. 1, the cells 114 and 116 may partially overlap, such that the base station 104 can hand the UE 102 over to the base station 106 and vice versa. Some of the base stations operating in the network 100 may be interconnected. For example, the base station 104 may connect to the base station 106 via an Xn interface (not shown in FIG. 1).

In the wireless communication system 100, the UE 102, 5GC 110 and RAN 112 implement an access control mechanism (e.g., UAC). Generally, the network (collectively, the 5GC 110 and/or the RAN 112) applies access control to messages associated with a certain access category (e.g., to reduce network congestion), and notifies the UE 102 (as well as other UEs not shown in FIG. 1) accordingly. In response, the UE 102 and any other UEs in the system 100 begin to apply access control to (e.g., selectively transmit, suspend, or deny/prevent) message transmissions in the specified access category, as discussed further below. Although certain examples below refer specifically to 5GC and the 5G NR radio access technology (RAT), in general the techniques of this disclosure can also apply to any other suitable radio access and/or core network technologies.

The 5GC 110 includes processing hardware 120 (e.g., in an Access and Mobility Management Function (AMF) device or another suitable device) that can include one or more general-purpose processors, such as central processing units (CPUs) and non-transitory computer-readable memory storing machine-readable instructions executable on the one or more general-purpose processors, and/or special-purpose processing units. The processing hardware 120, in an example implementation, includes a congestion controller 122 configured to determine when congestion levels for various access categories reach a certain threshold level or fall below the threshold level, and cause the RAN 112 to notify UEs currently operating in the cells (e.g., cells 114 and/or 116) of the RAN 112. More particularly, the 5GC 110 can generate updated barring information (e.g., higher or lower values of barring factors for particular access categories), and the base stations 104 and/or 106 can broadcast this information in the cells 114 and/or 116, respectively, as a part of system information (e.g., in SIBs). In some implementations, the RAN 112 (e.g., the base station 104) can include processing hardware that implements the congestion controller 122 instead of, or in addition to, the 5GC 110.

The UE 102 is equipped with processing hardware 130 that may include one or more general-purpose processors (e.g., CPUs) and non-transitory computer-readable memory storing machine-readable instructions executable on the one or more general-purpose processors, and/or special-purpose processing units. The processing hardware 130, in an example implementation, includes a radio resource control (RRC) controller 132 configured to generate outbound (uplink) and process inbound (downlink) messages related to RRC layer functions such as releasing existing radio connections, setting up new radio connections, reconfiguring existing radio connections, etc. The processing hardware 130 further includes a non-access stratum (NAS) controller 134 configured to perform NAS layer functions (e.g., functions relating to mobility management, such as handling registration, attachment, and/or tracking area update procedures).

In an example implementation, the RRC controller 132 includes an RRC UAC module 142 (i.e., an entity configured to perform UAC procedures specific to the RRC layer), and the NAS controller 134 includes an NAS UAC module 144 (i.e., an entity configured to perform procedures specific to the NAS layer or layers). The RRC UAC module 142 is configured to process system information received from (e.g., broadcast by) the RAN 112, including barring factor values, and possibly also values indicative of the duration for an access control ("barring") timer. The NAS UAC module 144 determines/decides when messages associated with certain access categories are ready for transmission to the RAN 112, and requests the transmission when a message is ready. In response to receiving such a request (or notification), the RRC UAC module 142 performs access barring (UAC) checks based on the received value of the barring factor (e.g., according to any of the methods discussed below). The RRC UAC module 142 can also report barring information to the NAS UAC module 144. For example, the RRC UAC module 142 may notify the NAS UAC module 144 when access barring is alleviated, to prompt the NAS UAC module 144 to determine whether a particular message transmission is still needed.

As the term is used herein, access barring "alleviation" generally refers to a transition from a network state in which the user device is barred from transmitting a particular message (e.g., a message within a particular access category), to a network state in which the user device is no longer barred from transmitting the message. Thus, for example, the user device may transmit the message after access barring is alleviated, or may instead decide that transmission of the message is no longer needed and decide not to transmit the message.

Figure 2:
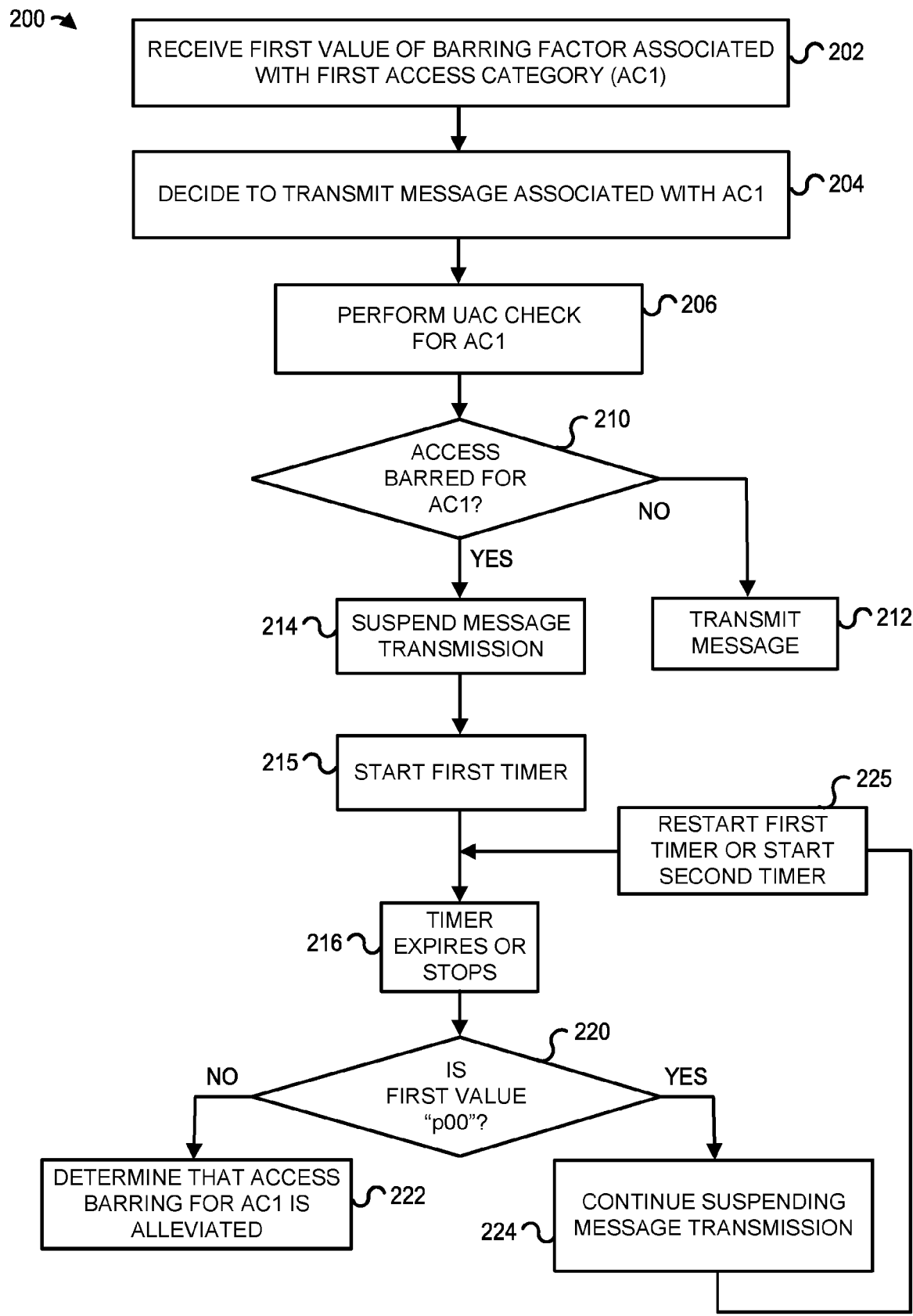
FIGS. 2 through 11 are flow diagrams of example methods for avoiding undesired message transmissions from a user device to a RAN, which may be implemented by the UE in the wireless communication system of FIG. 1.
Figure 3:
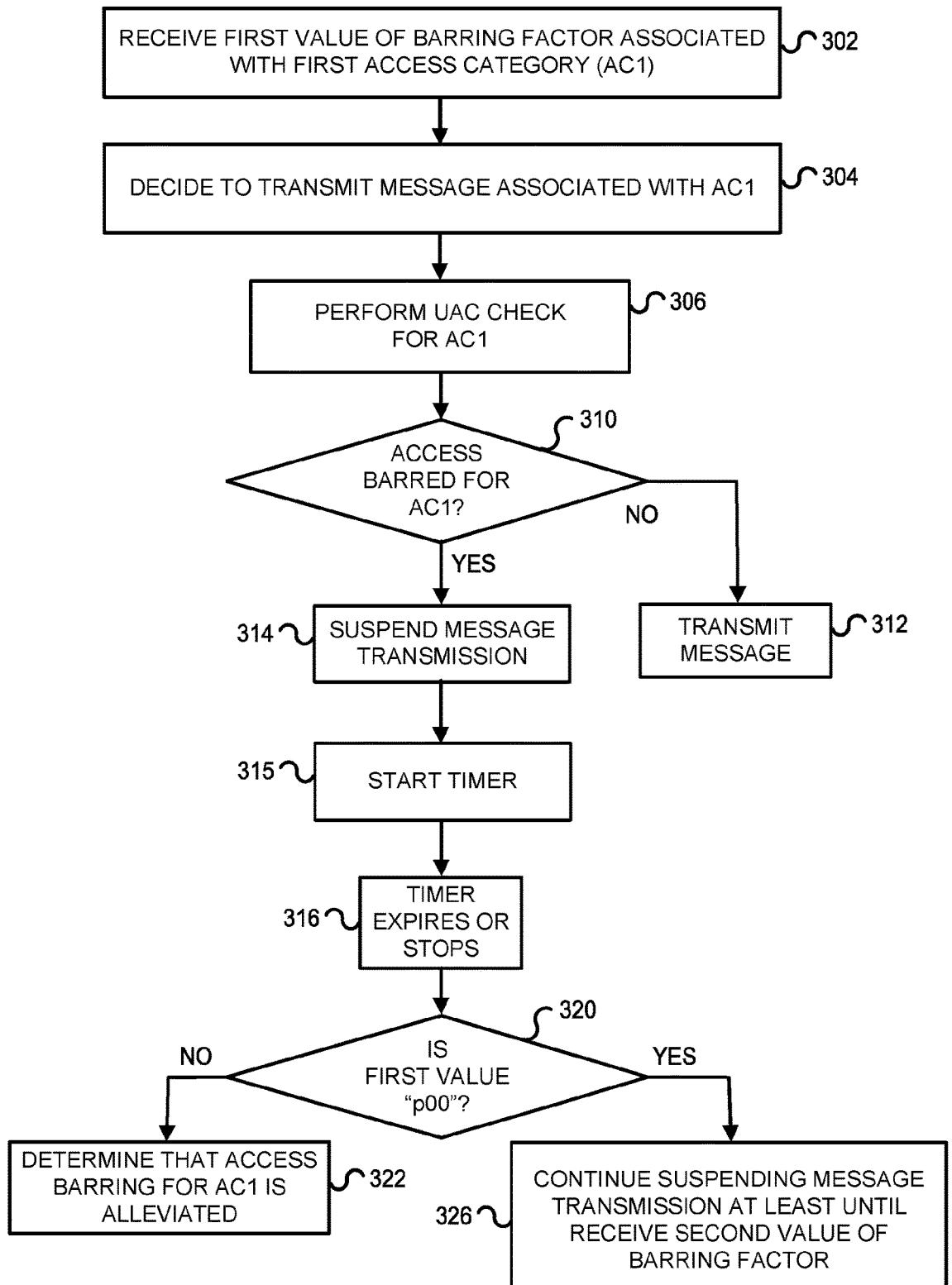
Figure 5:
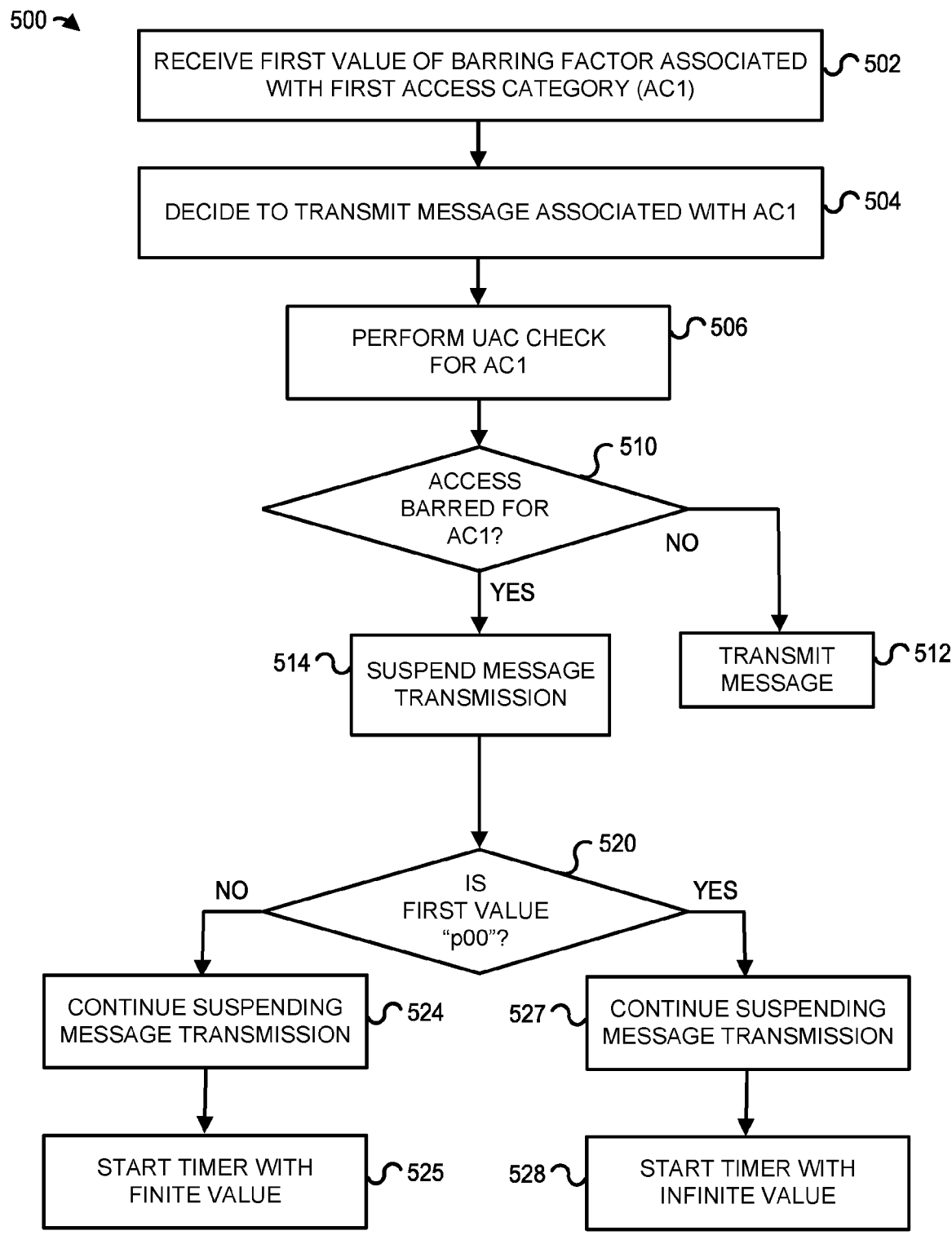
Figure 6:
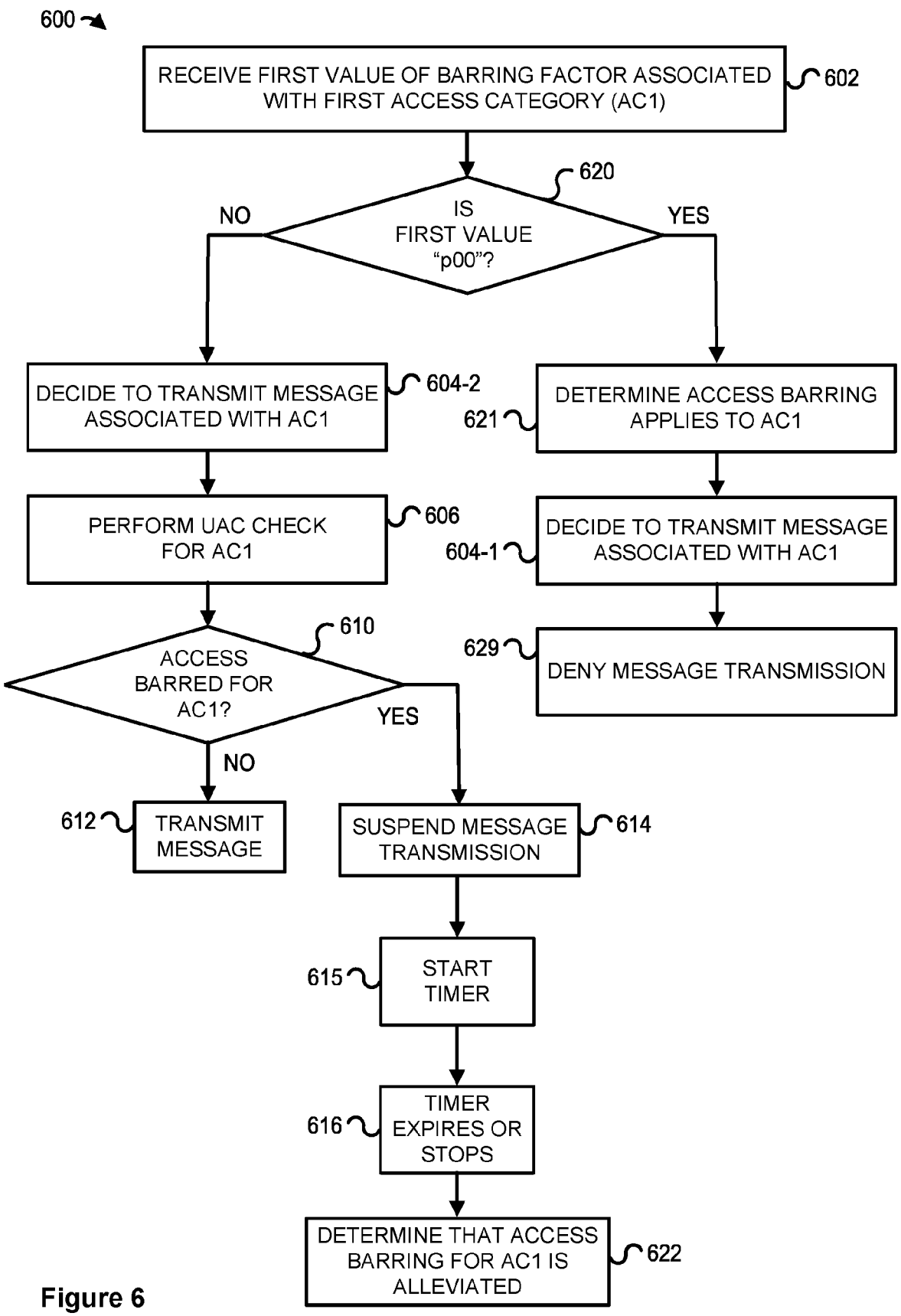
Figure 7:
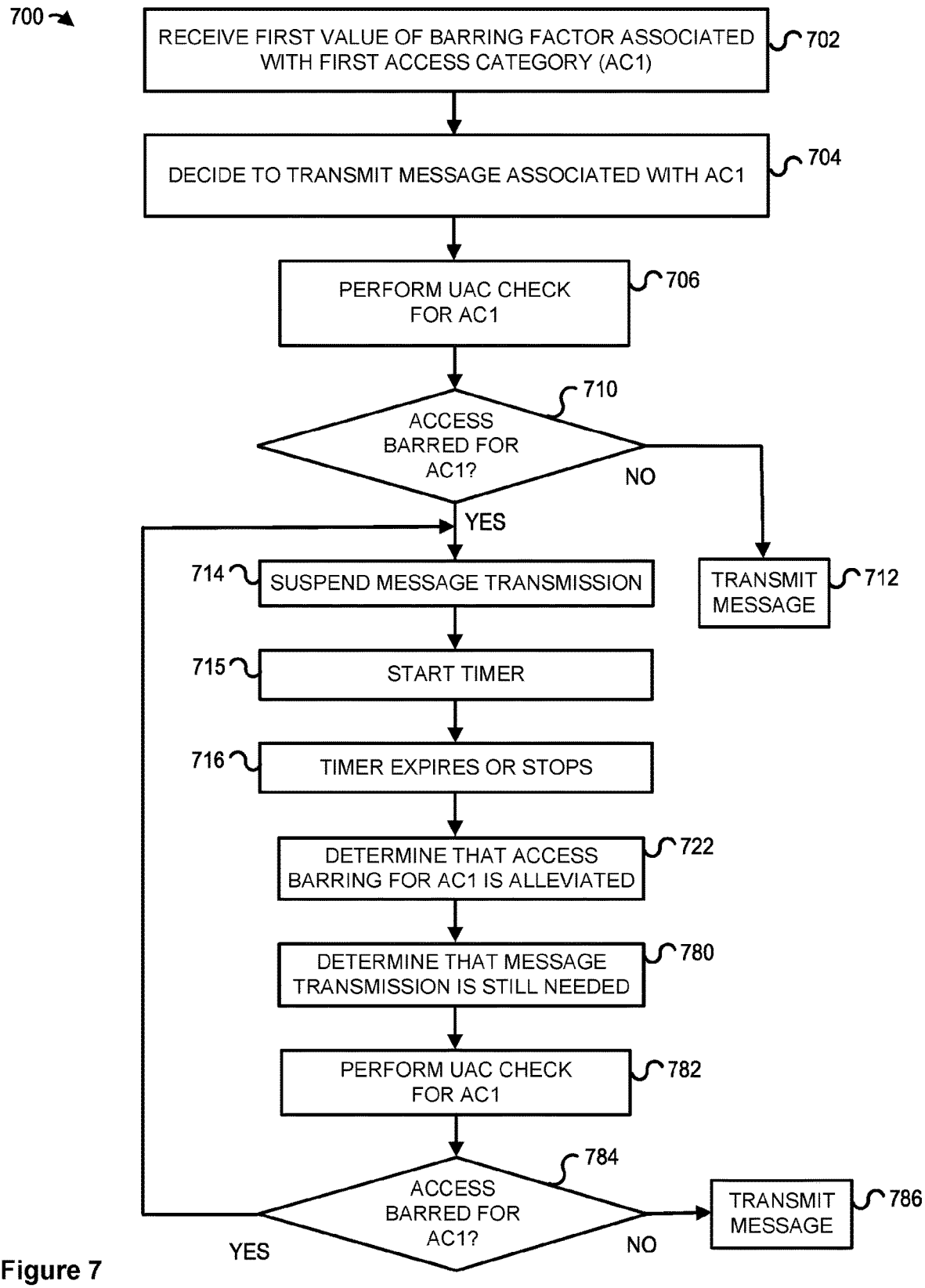

Example operation of the UE 102 within the wireless communication system 100 will now be discussed with reference to the flow diagrams of FIGS. 2 through 7. FIGS. 2 and 3 depict implementations of a technique in which the UE 102 performs a UAC check and runs a timer, and then decides to take different actions based on whether the barring factor value corresponds to the maximum barring probability (i.e., in these examples, based on whether the barring factor value is "p00"). FIGS. 4 and 5 depict implementations of a technique in which the UE 102 performs a UAC check, but then decides whether to run a finite-value timer based on whether the barring factor value is "p00". FIG. 6 depicts an implementation of a technique in which the UE 102 only performs the UAC check if the barring factor value is not "p00", and denies/prevents message transmission if the barring factor value is "p00". FIG. 7 depicts an implementation of a technique in which the UE 102 performs a first UAC check when deciding to transmit a message, and then repeats the UAC check every time that a barring timer expires or stops (i.e., is interrupted).

Referring first to FIG. 2, in a method 200, the UE 102 receives 202 from the RAN 112 a first value of a barring factor associated with a first access category (shown in FIG. 2 as "AC1"). The barring factor value may be part of a first system information (e.g., a SIB broadcast by base station 104). At some point thereafter, the UE 102 (e.g., NAS UAC module 144) decides 204 to transmit a message associated with the first access category.

In response to deciding 204 to transmit the message (e.g., in response to the NAS UAC module 144 sending the RRC UAC module 142 an IPL message that includes the information that the access barring check is associated the first access category, and/or the message to be transmitted), the UE 102 (e.g., the RRC UAC module 142) performs 206 a UAC check for the first access category. For example, the UE 102 may generate a random number based on a uniform probability distribution between 0 and 1, and then compare the random number to the first value of the barring factor. As used herein, the term "random number" encompasses pseudo-randomly generated numbers. In one implementation, if the random number is greater than or equal to the first value, the UE 102 determines that access barring does not apply to the first access category, but if the random number is less than the first value, the UE 102 determines that access barring applies to the first access category. In some implementations, if access is barred, the RRC UAC module 142 sends an IPL message to the NAS UAC module 144 to indicate that access barring applies to the first access category.

Based on the result of the UAC check, the UE 102 determines 210 which action(s) to take. If access is not barred, the UE 102 transmits 212 the message to the RAN 112 (e.g., to base station 104). If access is barred, however, the UE 102 suspends 214 the message transmission. For example, the NAS UAC module 144 may suspend 214 the message transmission in response to receiving an indication of access barring from the RRC UAC module 142. The UE 102 (e.g., the RRC UAC module 142) starts 215 a first timer, which runs while the UE 102 suspends 214 the message transmission. The UE 102 may configure the first timer to run for a duration specified in first system information that the UE 102 received 202 earlier, for example.

At some point thereafter, the first timer expires or stops 216. That is, the timer either expires by running for its full duration (i.e., as configured/set by the UE 102), or stops in response to an event that interrupts the timer operation. For example, the RRC UAC module 142 may be configured to stop the timer in response to detecting the occurrence of any of a set of one or more predefined events, such as the UE 102 receiving a particular message (e.g., an RRCSetup message, an RRCResume message, an RRCRelease message, an RRCReconfiguration message, a MobilityFromNRCommand message, an RRCReestablishment message, or a Paging message), the UE 102 entering a particular state (e.g., an RRC_IDLE, RRC_INACTIVE, or RRC_CONNECTED state), the UE 102 selecting or reselecting to a particular cell (e.g., cell 114 or 116), and/or the UE 102 being handed over to another base station (e.g., from base station 104 to base station 106).

After (e.g., in response to) the timer expiration or stoppage 216, the UE 102 determines 220 whether the first value of the barring factor is "p00" (i.e., the value corresponding to a 100% probability of access barring). In other implementations, a different value (other than "p00") may indicate a 100% probability of access barring, and/or the maximum probability of barring may be lower than 100% (e.g., 99%). It is understood that the determination 220 need not be the first instance in which the UE 102 determines that the first value is "p00", and need not be a direct inspection of the first value. For example, for the determination 220, the UE 102 may directly inspect the barring factor a second time (e.g., with the UE 102 having first inspected the barring factor when performing 206 the UAC check), or may involve the UE 102 inspecting a flag or state that the UE 102 set/configured earlier in the method 200 (e.g., when performing 206 the UAC check), etc.

If the UE 102 determines 220 that the first value is not "p00", the UE 102 determines 222 that the access barring for the first access category is alleviated. Thus, for example, the RRC UAC module 142 may send an IPL message to the NAS UAC module 144 indicating that access barring is alleviated for the first access category. In response to that IPL message, the NAS UAC module 144 may determine to transmit (i.e., trigger transmission of) the suspended message (e.g., by sending the message to the RRC controller 132 or the RRC UAC module 142), or may determine that the message is no longer needed, for example.

If the UE 102 instead determines 220 that the first value is "p00", the UE 102 continues 224 to suspend the message transmission. For example, in response to determining that the first value is "p00", the RRC UAC module 142 may decide not to send an IPL message indicating access barring alleviation to the NAS UAC module 144, and thus the NAS UAC module 144 may continue 224 to suspend the message transmission as a default state.

While the UE 102 continues 224 to suspend the message transmission, the UE 102 (e.g., the RRC UAC module 142) restarts or starts 225 a timer. That is, the UE 102 either restarts the first timer, or starts a different, second timer. As seen in FIG. 2, the method 200 includes a loop such that the UE 102 continues 224 to suspend the message transmission until the (first or second) timer expires or stops 216, after which the UE 102 again determines 220 whether the barring factor value is "p00", and so on. It is understood, however, that for the second and any subsequent iterations of the determination 220, the barring factor value may be different than the first value. For example, before the expiration 216 of the second timer (or restarted first timer), the UE 102 may have received a different, second value of the barring factor (e.g., in a new SIB from the base station 104 or base station 106). Thus, the outcome of the determination 220 may differ from one iteration to the next.

As seen from FIG. 2, the UE 102 does not determine 222 that access barring is alleviated for the first access category so long as the barring factor value is "p00". Thus, the UE 102 does not transmit messages associated with the first access category in situations where the network (i.e., the 5GC 110 and/or the RAN 112) decides that such messages are not permitted.

Referring next to FIG. 3, in a method 300, the UE 102 receives 302 from the RAN 112 a first value of a barring factor associated with a first access category (shown in FIG. 3 as "AC1"). The barring factor value may be part of a first system information (e.g., a SIB broadcast by base station 104). At some point thereafter, the UE 102 (e.g., NAS UAC module 144) decides 304 to transmit a message associated with the first access category. In response to deciding 304 to transmit the message, the UE 102 (e.g., the RRC UAC module 142) performs 306 a UAC check for the first access category. The receiving 302, deciding 304 and performing 306 may be the same as or similar to the receiving 202, deciding 204 and performing 206 of the method 200, for example.

Based on the result of the UAC check, the UE 102 determines 310 which action(s) to take. If access is not barred, the UE 102 transmits 312 the message to the RAN 112 (e.g., to base station 104). If access is barred, however, the UE 102 suspends 314 the message transmission. For example, the NAS UAC module 144 may suspend 314 the message transmission in response to receiving an indication of access barring from the RRC UAC module 142. The UE 102 (e.g., the RRC UAC module 142) starts 315 a timer, which runs while the UE 102 suspends 314 the message transmission. The UE 102 may configure the timer to run for a duration specified in first system information that the UE 102 received 302 earlier, for example.

At some point thereafter, the timer expires or stops 316 (e.g., as described above in connection with the expiration or stoppage 216 of the first timer in the method 200). After (e.g., in response to) the timer expiration or stoppage 316, the UE 102 determines 320 whether the first value of the barring factor is "p00" (i.e., the value corresponding to a 100% probability of access barring) or, in other implementations, some other value corresponding to the maximum probability of access barring. As explained above in connection with the determination 220 of the method 200, the determination 320 need not be the first instance in which the UE 102 determines that the first value is "p00", and need not be a direct inspection of the first value.

If the UE 102 determines 320 that the first value is not "p00", the UE 102 determines 322 that the access barring for the first access category is alleviated. Thus, for example, the RRC UAC module 142 may send an IPL message to the NAS UAC module 144 indicating that access barring is alleviated for the first access category. In response to that IPL message, the NAS UAC module 144 may determine to transmit (i.e., trigger transmission of) the suspended message (e.g., by sending the message to the RRC controller 132 or the RRC UAC module 142), or may determine that the message is no longer needed, for example.

If the UE 102 instead determines 320 that the first value is "p00", the UE 102 continues 326 to suspend the message transmission indefinitely, and at least until the UE 102 receives a second value of the barring factor for the first access category (e.g., as part of system information in a new SIB from base station 104 or 106). Various example operations of the UE 102, after the UE 102 receives the second barring factor value, are described in further detail below with reference to the implementations of FIGS. 4E through 4G. Depending on the implementation and/or scenario, the method 300 may include, after the UE 102 continues 326 to suspend the message transmission, the operations shown in any of FIGS. 4E through 4G.

As seen from FIG. 3, if the barring factor value is "p00", the UE 102 does not necessarily determine 322 that access barring is alleviated for the first access category simply because the barring timer expires or stops. Moreover, as will be seen in the various implementations of FIGS. 4E through 4G described below, the UE 102 may continue 326 to suspend the message transmission indefinitely, and at least until the UE 102 receives a barring factor value other than "p00". Thus, at least in some implementations and/or scenarios, the UE 102 does not transmit messages associated with the first access category in situations where the network (i.e., the 5GC 110 and/or the RAN 112) decides that such messages are not permitted.

Figure 4A:
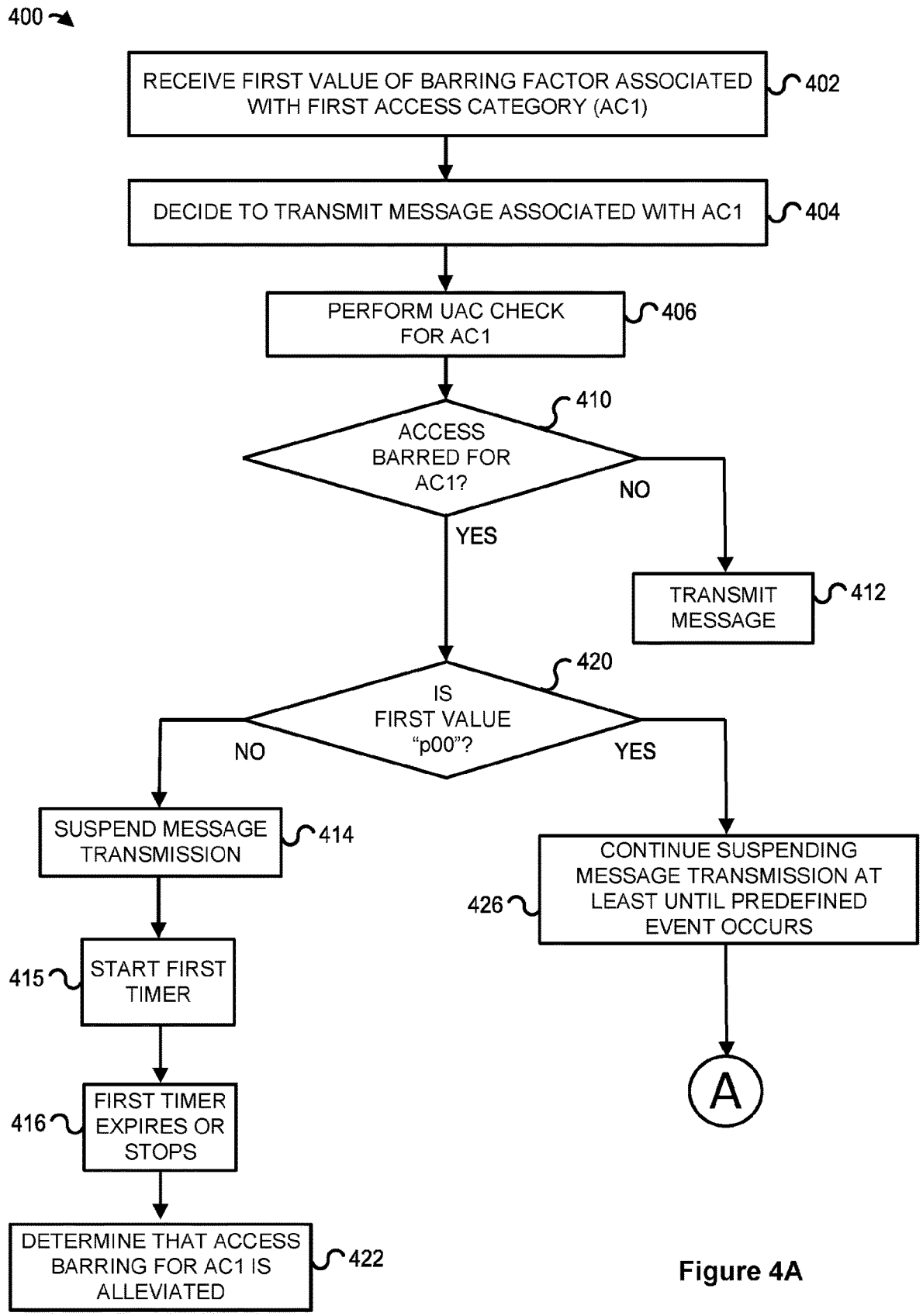
Figure 4B:
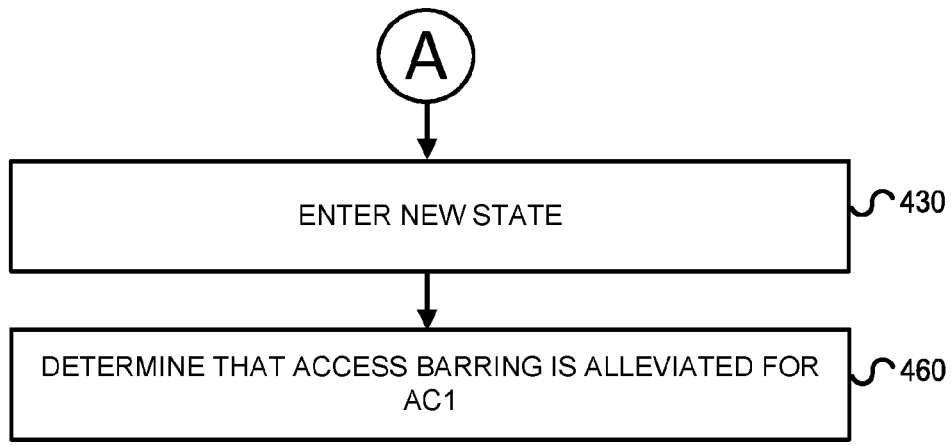

Referring next to FIG. 4A, in a method 400, the UE 102 receives 402 from the RAN 112 a first value of a barring factor associated with a first access category (shown in FIG. 4 as "AC1"). The barring factor value may be part of a first system information (e.g., a SIB broadcast by base station 104). At some point thereafter, the UE 102 (e.g., NAS UAC module 144) decides 404 to transmit a message associated with the first access category. In response to deciding 404 to transmit the message, the UE 102 (e.g., the RRC UAC module 142) performs 406 a UAC check for the first access category. The receiving 402, deciding 404 and performing 406 may be the same as or similar to the receiving 202, deciding 204 and performing 206 of the method 200, for example.

Based on the result of the UAC check, the UE 102 determines 410 which action(s) to take. If access is not barred, the UE 102 transmits 412 the message to the RAN 112 (e.g., to base station 104). If access is barred, however, the UE 102 determines 420 whether the first value of the barring factor is "p00" or, in other implementations, some other value corresponding to the maximum probability of access barring. As explained above in connection with the determination 220 of the method 200, the determination 420 need not be the first instance in which the UE 102 determines that the first value is "p00", and need not be a direct inspection of the first value. In some implementations, the UE 102 sets an access barring flag when the UE 102 determines 410 that access barring applies to the first access category and also determines 420 that the barring factor value is "p00".

If the UE 102 determines 420 that the first value is not "p00", the UE 102 suspends 414 the message transmission and starts 415 a first timer that runs while the UE 102 suspends 414 the message transmission. The suspension 414 and starting 415 may be similar to or the same as the suspension 214 and starting 215 of the method 200, for example. At some point thereafter, the first timer expires or stops 416 (e.g., as described above in connection with the expiration or stoppage 216 of the first timer in the method 200). After the first timer expires or stops 416, the UE 102 determines 422 that the access barring for the first access category is alleviated. Thus, for example, the RRC UAC module 142 may send an IPL message to the NAS UAC module 144 indicating that access barring is alleviated for the first access category. In response to that IPL message, the NAS UAC module 144 may determine to transmit (i.e., trigger transmission of) the suspended message (e.g., by sending the message to the RRC controller 132 or the RRC UAC module 142), or may determine that the message is no longer needed, for example.

In an alternative implementation and/or scenario (not shown in FIG. 4A), the UE 102 receives a second value of the barring factor (e.g., as part of system information in a new SIB), before the first timer expires or stops 416, and determines whether the second value is "p00". If the second value is not "p00", the UE 102 determines that access barring for the first access category is alleviated (e.g., as in the determination 422). If the second value is "p00", however, the UE 102 determines that access barring is still applicable. In some implementations, the UE 102 determines 422 that the access barring is alleviated irrespective of whether the UE 102 receives a new barring factor value from the RAN 112. Moreover, in some implementations, the UE 102 may perform another UAC check and/or start another barring timer if certain events occur before the first timer expires 416 (e.g., if the UE 102 selects or reselects a cell, or receives a new barring factor value, etc.).

Returning now to the determination 420, if the UE 102 instead determines 420 that the first value is "p00", the UE 102 continues 426 to suspend the message transmission indefinitely, and at least until a predefined event occurs. For example, the UE 102 may be configured to suspend the message transmission until any one of a number (e.g., one, two, five, etc.) of predefined events occurs. The predefined events may include, for example, any of the events that cause a barring timer to stop (e.g., any of the events, discussed above with reference to FIG. 2, that cause the first timer of the method 200 to stop rather than expire). Additionally or alternatively, the predefined events may include the UE 102 receiving a new value of the barring factor associated with the first access category (e.g., as discussed above in connection with the method 300).

FIGS. 4B through 4G depict various example method portions (400-1 through 400-6, respectively) that the UE 102 may execute after continuing 426 to suspend the message transmission, according to different implementations and/or scenarios. In the method portion 400-1 of FIG. 4B, the UE 102 continues 426 to suspend the message transmission until the UE 102 enters 430 a particular new state (e.g., an RRC_IDLE, RRC_INACTIVE, or RRC_CONNECTED state). In response to entering 430 the new state, the UE 102 determines 460 that access barring is alleviated for the first access category. The UE 102 may respond to the determination 460 in the manner discussed above in connection with the determination 222 (e.g., sending certain IPL messages, and possibly transmitting the message), for example.

Figure 4C:
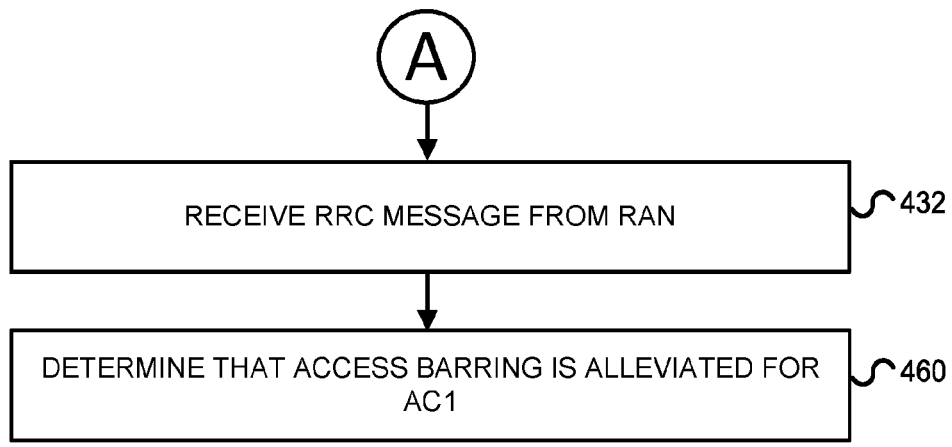

In the method portion 400-2 of FIG. 4C, the UE 102 continues 426 to suspend the message transmission until the UE 102 receives 432 a particular RRC message from the RAN 112 (e.g., an RRCSetup message, an RRCResume message, an RRCRelease message, an RRCReconfiguration message, a MobilityFromNRCommand message, an RRCReestablishment message, or a Paging message). In response to receiving 432 the RRC message, the UE 102 determines 460 that access barring is alleviated for the first access category. The UE 102 may respond to the determination 460 in the manner discussed above in connection with the determination 222 (e.g., sending certain IPL messages, and possibly transmitting the message), for example.

Figure 4D:
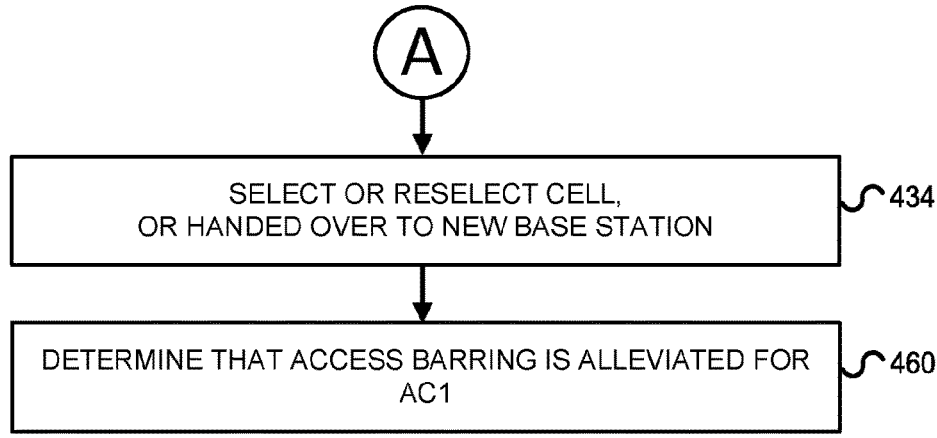

In the method portion 400-3 of FIG. 4D, the UE 102 continues 426 to suspend the message transmission until the UE 102 selects or reselects 434 a cell (e.g., cell 114 or 116), or is handed over 434 to a new base station (e.g., from base station 104 to base station 106). In response to selection/reselection/handover 434, the UE 102 determines 460 that access barring is alleviated for the first access category. The UE 102 may respond to the determination 460 in the manner discussed above in connection with the determination 222 (e.g., sending certain IPL messages, and possibly transmitting the message), for example.

Figure 4E:
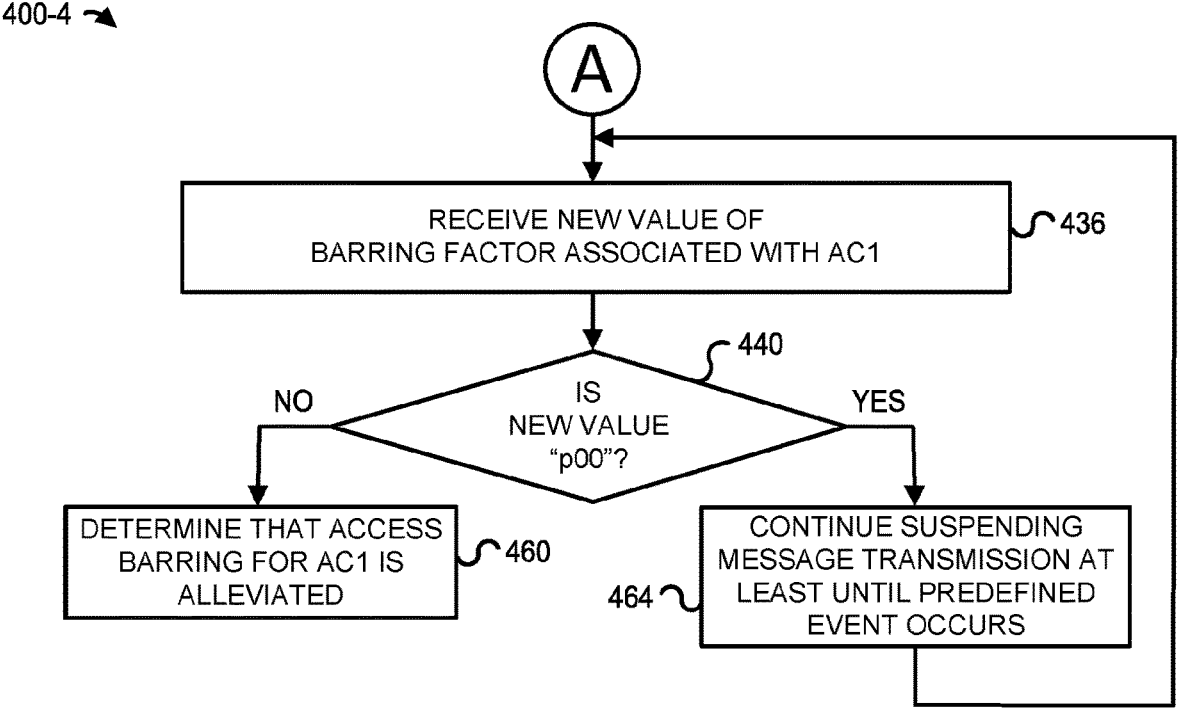

In the method portion 400-4 of FIG. 4E, the UE 102 continues 426 to suspend the message transmission until the UE 102 receives 436 a new value of the barring factor associated with the first access category (and possibly a new timer value/duration), from the RAN 112. The new barring factor value may be received as part of updated system information (e.g., in a new SIB). After receiving 436 the new barring factor value, the UE 102 determines 440 whether the new value is "p00". If the new value is not "p00", the UE 102 determines 460 that access barring is alleviated for the first access category. The UE 102 may respond to the determination 460 in the manner discussed above in connection with the determination 222 (e.g., sending certain IPL messages, and possibly transmitting the message), for example. In one implementation, the UE 102 checks whether the access barring flag (as discussed above in connection with FIG. 4A) is set after the UE 102 receives the updated barring factor value (e.g., in updated system information), and only attempts to determine whether the access barring is alleviated if the access barring flag is set. In some implementations, the UE 102 checks the barring factor value after the UE 102 receives a new barring factor value (e.g., in new system information), and the UE 102 determines the access barring associated with an access category is alleviated if the barring factor value associated with that access category is not "p00" and/or the barring timer associated with that access category is not running (e.g., the timer started at starting 415).

If the new value is "p00", however, the UE 102 responds by continuing 464 to suspend the message transmission at least until another predefined event occurs. While FIG. 4E shows a loop in which the UE 102 suspends the message transmission at least until the UE 102 again receives 436 a new barring factor value, in some implementations and/or scenarios the UE 102 determines that the access barring is alleviated if another predefined event occurs (e.g., as shown in FIGS. 4B through 4D).

Figure 4F:
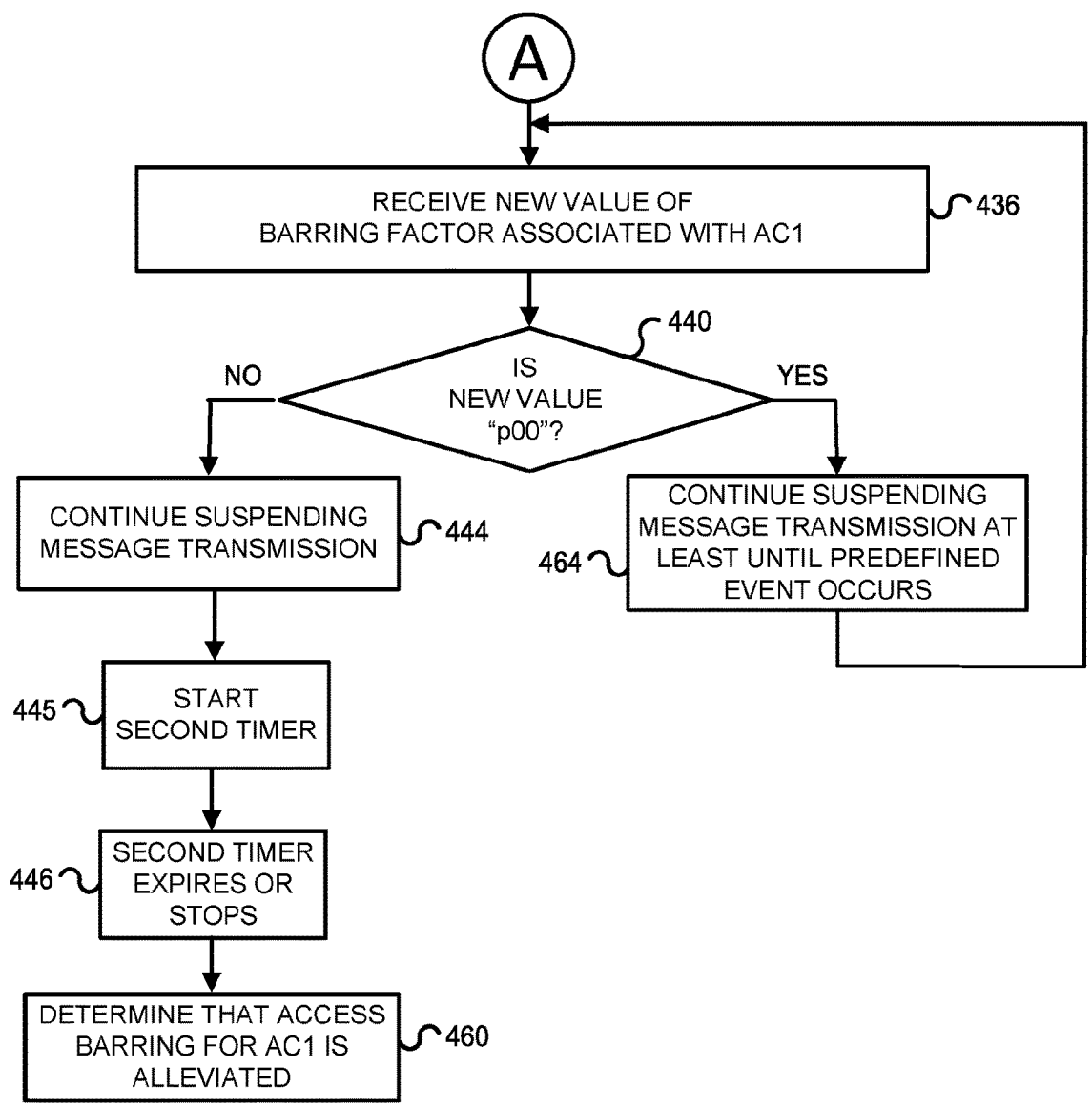

In the method portion 400-5 of FIG. 4F, the UE 102 continues 426 to suspend the message transmission until the UE 102 receives 436 a new value of the barring factor associated with the first access category (e.g., as part of system information in a new SIB), from the RAN 112 (e.g., as in the method portion 400-4). After receiving 436 the new barring factor value, the UE 102 determines 440 whether the new value is "p00". If the new value is "p00", the UE 102 operates as in the method portion 400-4 (i.e., continuing 464 to suspend the message transmission until the UE 102 again receives 436 a new barring factor value, or until some other predefined event occurs).

If the new value is not "p00", however, the UE 102 continues 444 suspending the message transmission and starts 445 a second timer. At some point, the second timer expires or stops 446 (e.g., similar to the expiration or stoppage 216 of the first timer in the method 200), in response to which the UE 102 determines 460 that the access barring for the first access category is alleviated. The UE 102 may respond to the determination 460 in the manner discussed above in connection with the determination 222 (e.g., sending certain IPL messages, and possibly transmitting the message), for example. In one implementation, the UE 102 checks whether the access barring flag (as discussed above in connection with FIG. 4A) is set after the UE 102 receives a new barring factor value (e.g., in new system information), and only attempts to take the actions as specified in 444, 445, 446 and/or 460 when the access barring flag is set.

Figure 4G:
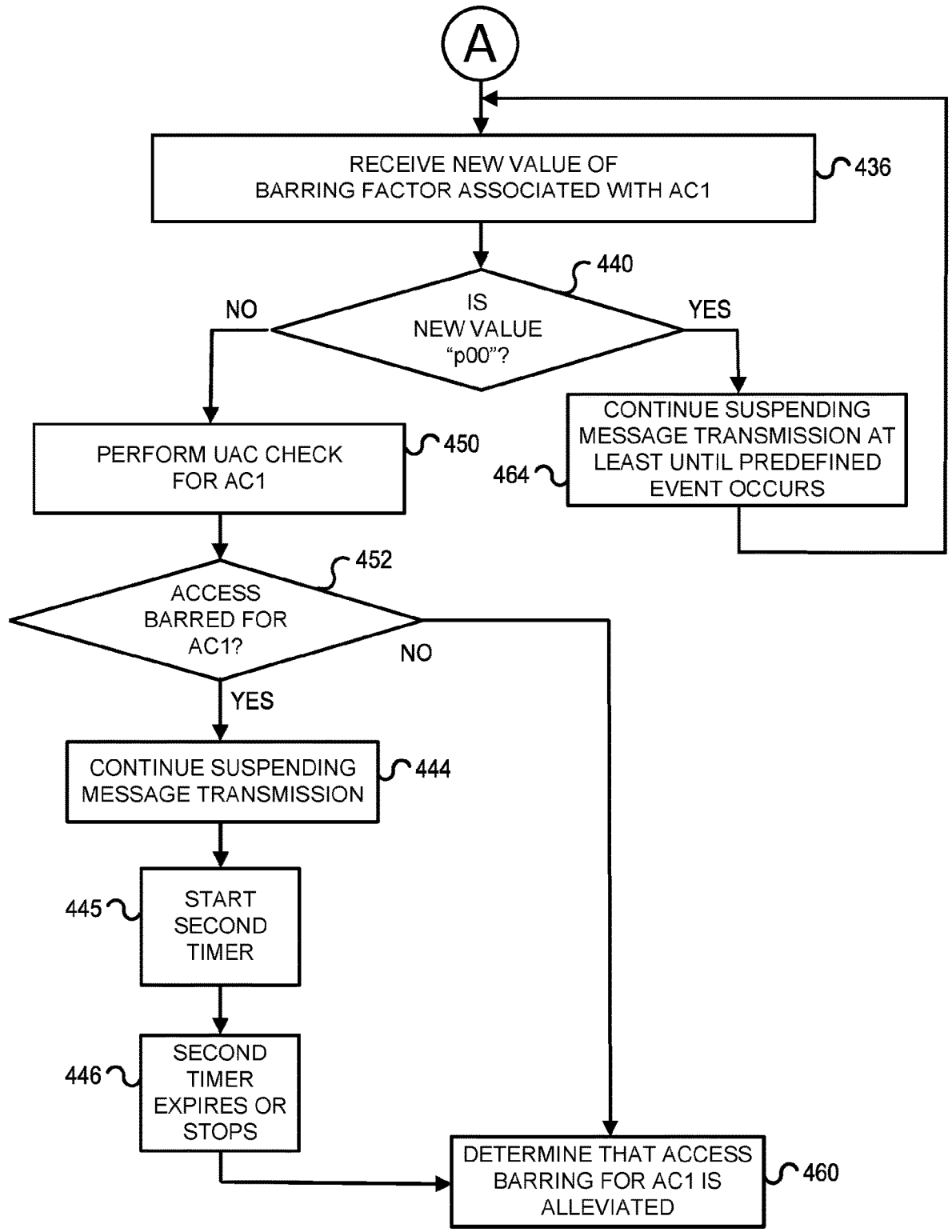

In the method portion 400-6 of FIG. 4G, the UE 102 continues 426 to suspend the message transmission until the UE 102 receives 436 a new value of the barring factor associated with the first access category (e.g., as part of system information in a new SIB), from the RAN 112 (e.g., as in the method portions 400-4 and 400-5). After receiving 436 the new barring factor value, the UE 102 determines 440 whether the new value is "p00". If the new value is "p00", the UE 102 operates as in the method portions 400-4 and 400-5 (i.e., continuing 464 to suspend the message transmission until the UE 102 again receives 436 an updated barring factor value, or until some other predefined event occurs).

If the new value is not "p00", however, the UE 102 performs 450 another UAC check using the new value of the barring factor (e.g., by generating another random number and comparing the random number to the new value, similar to the UAC check that the UE 102 performed 406 earlier). If the UE 102 determines 452 that access barring applies to the first access category (e.g., if the random number is not less than the new value of the barring factor), the UE 102 continues 444 suspending the message transmission and starts 445 a second timer. At some point, the second timer expires or stops 446 (e.g., similar to the expiration or stoppage 216 of the first timer in the method 200), in response to which the UE 102 determines 460 that the access barring for the first access category is alleviated. The UE 102 also determines 460 that the access barring for the first access category is alleviated if the UE 102 determines 452 that access barring does not apply to the first access category (e.g., if the random number is less than the new value of the barring factor). In either case, the UE 102 may respond to the determination 460 in the manner discussed above in connection with the determination 222 (e.g., sending certain IPL messages, and possibly transmitting the message), for example. In one implementation, the UE 102 check whether the access barring flag (as discussed above in connection with FIG. 4A) is set after the UE 102 receives a new barring factor value (e.g., in new system information), and only attempts to take the actions as specified in 450, 452, 444, 445, 446 and/or 460 if the access barring flag is set.

As seen in FIGS. 4A through 4G, if the barring factor value is "p00", the UE 102 does not necessarily determine 422 that access barring is alleviated for the first access category simply because the barring timer expires or stops. Moreover, the UE 102 may continue 464 to suspend the message transmission indefinitely until the UE 102 receives a barring factor value other than "p00" (or, in some implementations, until a different event occurs, such as cell selection or reselection, etc.). Thus, at least in some implementations and/or scenarios, the UE 102 does not transmit messages associated with the first access category in situations where the network (i.e., the 5GC 110 and/or the RAN 112) decides that such messages are not permitted.

Referring next to FIG. 5, in a method 500, the UE 102 receives 502 from the RAN 112 a first value of a barring factor associated with a first access category (shown in FIG. 5 as "AC1"). The barring factor value may be part of a first system information (e.g., a SIB broadcast by base station 104). At some point thereafter, the UE 102 (e.g., NAS UAC module 144) decides 504 to transmit a message associated with the first access category. In response to deciding 504 to transmit the message, the UE 102 (e.g., the RRC UAC module 142) performs 506 a UAC check for the first access category. The receiving 502, deciding 504 and performing 506 may be the same as or similar to the receiving 202, deciding 204 and performing 206 of the method 200, for example.

Based on the result of the UAC check, the UE 102 determines 510 which action(s) to take. If access is not barred, the UE 102 transmits 512 the message to the RAN 112 (e.g., to base station 104). If access is barred, however, the UE 102 suspends 514 the message transmission. For example, the NAS UAC module 144 may suspend 514 the message transmission in response to receiving an indication of access barring from the RRC UAC module 142.

The UE 102 then determines 520 whether the first value of the barring factor is "p00" or, in other implementations, some other value corresponding to the maximum probability of access barring. As explained above in connection with the determination 220 of the method 200, the determination 520 need not be the first instance in which the UE 102 determines that the first value is "p00", and need not be a direct inspection of the first value.

If the UE 102 determines 520 that the first value is not "p00", the UE 102 continues 524 to suspend the message transmission and starts 525 a timer with a finite value. While not shown in FIG. 5 to avoid clutter, the UE 102 may then determine that the access barring for the first access category is alleviated after the timer expires or stops (e.g., as discussed above with reference to the expiring or stopping 416 and determining 422 of the method 400).

If the UE 102 determines 520 that the first value is "p00", the UE 102 continues 527 suspending the message transmission and starts 528 a timer with an infinite value. Thus, the user device prevents/denies the message transmission. In other implementations, the UE 102 instead prevents/denies the message transmission in a different manner, such as by canceling the message transmission. For example, the NAS UAC module 144 may cancel the message transmission in response to receiving an IPL message from the RRC UAC module 142.

Thus, as can be seen in FIG. 5, the UE 102 does not transmit messages associated with the first access category in situations where the network (i.e., the 5GC 110 and/or the RAN 112) decides that such messages are not permitted, i.e., when the barring factor value is "p00".

Referring next to FIG. 6, in a method 600, the UE 102 receives 602 from the RAN 112 a first value of a barring factor associated with a first access category (shown in FIG. 6 as "AC1"). The barring factor value may be part of a first system information (e.g., a SIB broadcast by base station 104). After receiving 602 the first barring factor value, the UE 102 determines 620 whether the first value is "p00" or, in other implementations, some other value corresponding to the maximum probability of access barring. As explained above in connection with the determination 220 of the method 200, the determination 620 need not be the first instance in which the UE 102 determines that the first value is "p00", and need not be a direct inspection of the first value.

If the UE 102 determines 620 that the first value is "p00", the UE 102 determines 621 (i.e., concludes) that access barring applies to the first access category. Later, when the UE 102 (e.g., the NAS UAC module 144) decides 604-1 to transmit a message associated with the first access category, the UAC denies 629 the message transmission based on the determination 621. For example, the RRC UAC module 142 may send the NAS UAC module 144 a message that causes the NAS UAC module 144 to cancel the transmission, or may set a barring timer to an infinite value, etc.

If the UE 102 determines 620 that the first value is not "p00", the UE 102 does not yet come to a conclusion regarding whether access barring applies to the first access category. At some point, however, the UE 102 decides 604-2 to transmit a message associated with the first access category and, in response, performs 606 a UAC check for the first access category. The performing 606 may be similar to or the same as the performing 206 of the method 200, for example.

Based on the result of the UAC check, the UE 102 determines 610 which action(s) to take. If access is not barred, the UE 102 transmits 612 the message to the RAN 112 (e.g., to base station 104). If access is barred, however, the UE 102 suspends 614 the message transmission, starts 615 a timer (which runs while the UE 102 suspends 614 the message transmission), and, after the timer expires or stops 616, determines 622 that the access barring for the first access category is alleviated. The suspending 614, starting 615, expiring or stopping 616, and determining 622 may be similar to or the same as the suspending 414, starting 415, expiring or stopping 416, and determining 422 of the method 400, for example.

Thus, as can be seen in FIG. 6, the UE 102 does not transmit messages associated with the first access category in situations where the network (i.e., the 5GC 110 and/or the RAN 112) decides that such messages are not permitted, i.e., when the barring factor value is "p00".

Referring next to FIG. 7, in a method 700, the UE 102 receives 702 from the RAN 112 a first value of a barring factor associated with a first access category (shown in FIG. 7 as "AC1"). The barring factor value may be part of a first system information (e.g., a SIB broadcast by base station 104). At some point thereafter, the UE 102 (e.g., NAS UAC module 144) decides 704 to transmit a message associated with the first access category. In response to deciding 704 to transmit the message, the UE 102 (e.g., the RRC UAC module 142) performs 706 a UAC check for the first access category. The receiving 702, deciding 704 and performing 706 may be the same as or similar to the receiving 202, deciding 204 and performing 206 of the method 200, for example.

Based on the result of the UAC check, the UE 102 determines 710 which action(s) to take. If access is not barred, the UE 102 transmits 712 the message to the RAN 112 (e.g., to base station 104). If access is barred, however, the UE 102 suspends 714 the message transmission, starts 715 a timer (which runs while the UE 102 suspends 714 the message transmission), and, after the timer expires or stops 716, determines 722 that the access barring for the first access category is alleviated. The suspending 714, starting 715, expiring or stopping 716, and determining 722 may be similar to or the same as the suspending 414, starting 415, expiring or stopping 416, and determining 422 of the method 400, for example.

In response to determining 722 that the access barring for the first access category is alleviated, the UE 102 determines 780 that the message transmission is still needed. For example, the RRC UAC module 142 may, in response to determining 722 that the access barring is alleviated, send an IPL message to the NAS UAC module 144 indicating that the access barring is alleviated. In response, the NAS UAC module 144 may determine 780 that the message transmission is still needed.

In response to the determination 780, the UE 102 (e.g., the RRC UAC module 142) performs 782 another UAC check for the first access category. The performing 782 may be the same as the performing 706, for example, but possibly with a new barring factor value (e.g., if the UE 102 received a new barring factor value). Based on the result of the UAC check, the UE 102 determines 784 which action(s) to take. If access is not barred, the UE 102 transmits 786 the message to the RAN 112 (e.g., to base station 104). If access is barred, however, the UE 102 again suspends 714 the message transmission, starts 715 the timer, and so on, as shown in FIG. 7. This loop may continue indefinitely, until the UE 102 at some point determines 784 that access barring does not apply to the first access category (e.g., because the UE 102 generates a sufficiently low random number, and/or because the UE 102 subsequently receives a new, higher value of the barring factor).

As can be seen in FIG. 7, the method 700 does not necessarily require that the UE 102 treat the "p00" barring factor value any differently than other barring factor values (e.g., "p05" through "p95"). Because a "p00" value will always (in this example) cause the UE 102 to determine (710 or 784) that access barring applies to the first access category, however, the UE 102 does not transmit messages associated with the first access category in situations where the network (i.e., the 5GC 110 and/or the RAN 112) decides that such messages are not permitted.

FIGS. 8 through 11 depict various methods, in a user device (e.g., the UE 102), for avoiding undesired message transmissions from the user device to a RAN (e.g., the RAN 112). The user device may perform the methods of FIGS. 8 through 11 in the wireless communication system 100 of FIG. 1, or in any other suitable wireless communication system that utilizes barring factors that the network can set to any one of a plurality of values, with the plurality of values corresponding to different probabilities that the user device will be barred from transmitting at least some messages (e.g., messages in a particular access category) to the RAN. The methods of FIGS. 2 through 7, discussed above, correspond to more specific implementations of the methods of FIGS. 8 through 11. In particular, the methods 200, 300 of FIGS. 2, 3 are specific implementations of the method 800 of FIG. 8, the methods 400, 500 of FIGS. 4, 5 are specific implementations of the method 900 of FIG. 9, the method 600 of FIG. 6 is a specific implementation of the method 1000 of FIG. 10, and the method 700 of FIG. 7 is a specific implementation of the method 1100 of FIG. 11. Conversely, whereas the methods of FIGS. 2 through 7 show pathways for alternative scenarios, at least the methods 800, 900 and 1100 reflect relatively specific scenarios (i.e., scenarios in which the user device determines that access barring applies to a message transmission when using a probabilistic technique).

Figure 8:
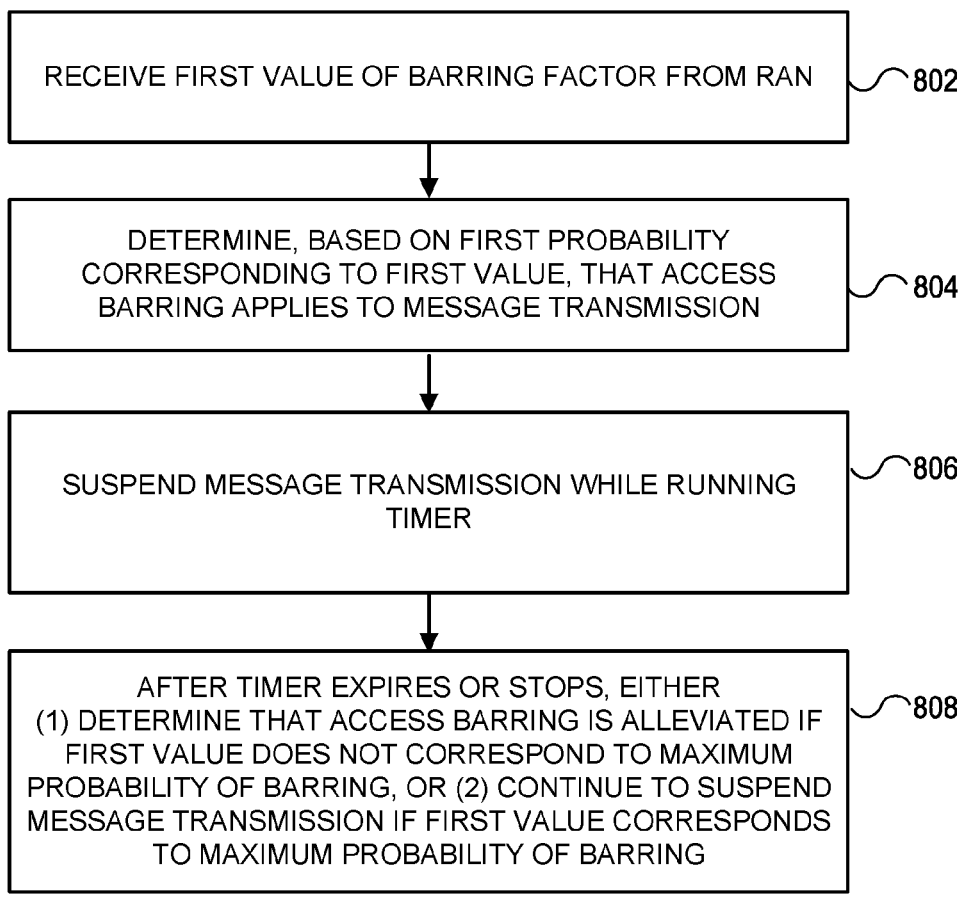

Referring first to FIG. 8, at block 802 of the method 800, the user device receives a first value of a barring factor from a RAN (e.g., the receiving 202 or 302). Thereafter, at block 804 and based on a first probability corresponding to the first value, the user device determines that access barring applies to a message transmission (e.g., the performing 206 and determining 210, or the performing 306 and determining 310).

The user device then (e.g., in response to the determination at block 804), at block 806, suspends the message transmission while running a timer (e.g., the suspending 214 or 314). After the timer expires or stops (e.g., the expiration or stoppage 216 or 316), at block 808, the user device either determines that the access barring is alleviated if the first value does not correspond to the maximum probability of barring (e.g., the determination 222 or 322), or continues to suspend the message transmission if the first value does correspond to the maximum probability of barring (e.g., the continuing 224 or 326).

Figure 9:
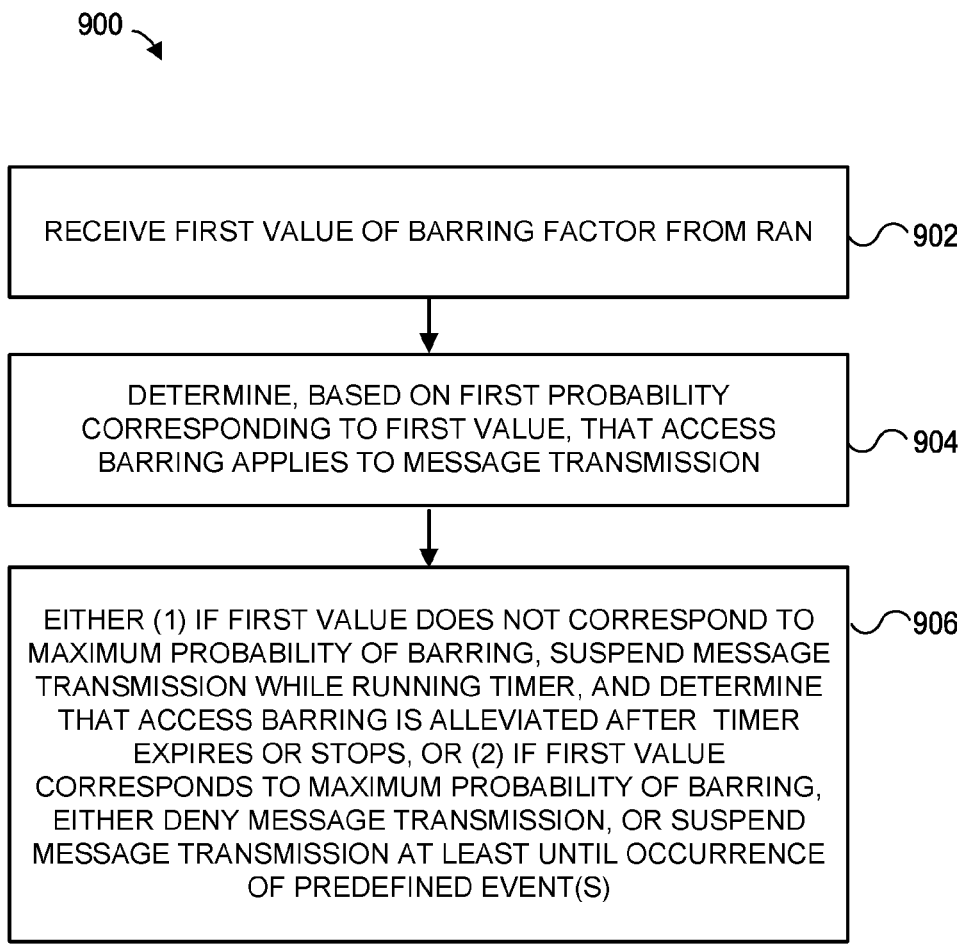

Referring next to FIG. 9, at block 902 of the method 900, the user device receives a first value of a barring factor from a RAN (e.g., the receiving 402 or 502). Thereafter, at block 904 and based on a first probability corresponding to the first value, the user device determines that access barring applies to a message transmission (e.g., the performing 406 and determining 410, or the performing 506 and determining 510).

At block 906, after (e.g., in response to) the determination at block 904, and if the first value does not correspond to the maximum probability of barring, the user device suspends the message transmission while running a timer (e.g., the suspending 414 and starting 415 or the continuing 524 and starting 525). If the first value does correspond to the maximum probability of barring, the user device instead either denies the message transmission (e.g., the continuing 527 and starting 528), or suspends the message transmission at least until the occurrence of one or more predefined events (e.g., the continuing 426).

Figure 10:
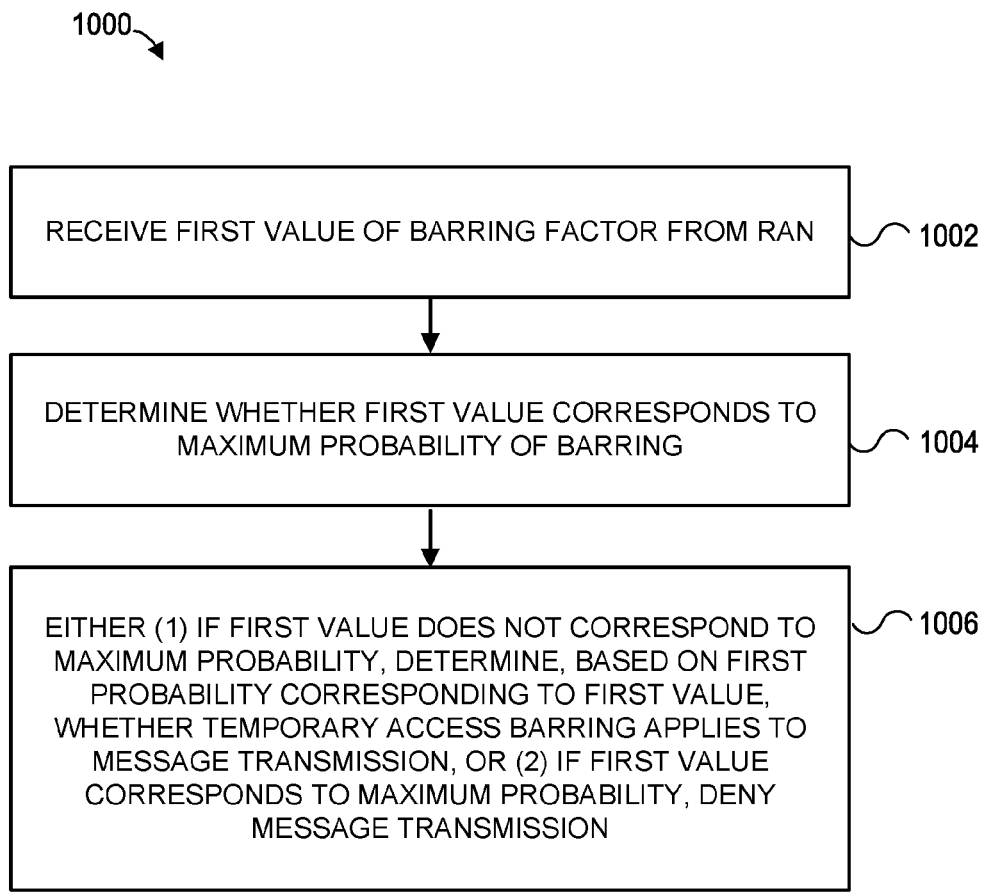

Referring next to FIG. 10, at block 1002 of the method 1000, the user device receives a first value of a barring factor from a RAN (e.g., the receiving 602). Thereafter, at block 1004, the user device determines whether the first value corresponds to the maximum probability of barring (e.g., the determining 620).

At block 1006, if the first value does not correspond to the maximum probability of barring, the user device determines, based on a first probability corresponding to the first value, whether temporary access barring applies to the message transmission (e.g., the performing 606 and determining 610). If the first value does correspond to the maximum probability of barring, the user device instead denies the message transmission (e.g., the denying 629).

Figure 11:
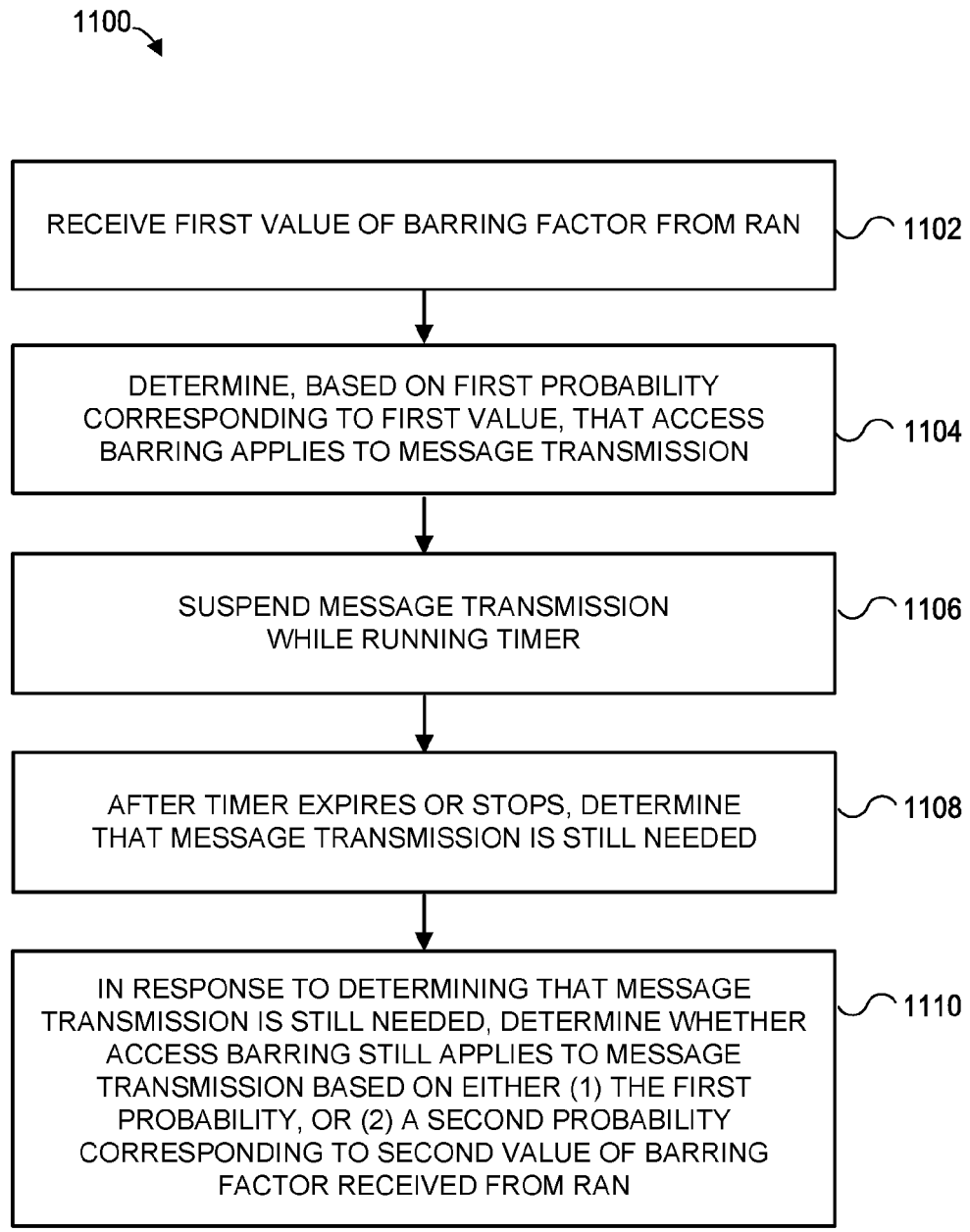

Referring next to FIG. 11, at block 1102 of the method 1100, the user device receives a first value of a barring factor from a RAN (e.g., the receiving 702). Thereafter, at block 1104, the user device determines, based on a first probability corresponding to the first value, that access barring applies to the message transmission (e.g., the performing 706 and determining 710).

At block 1106, the user device suspends the message transmission while running a timer (e.g., the suspending 714 and starting 715). At block 1108, after the timer expires or stops (e.g., the expiring or stopping 716), the user device determines that the message transmission is still needed (e.g., the determining 780). In response to the determination at block 1108, the user device determines whether the access barring still applies to the message transmission (e.g., the performing 782 and determining 784). The user device makes the determination at block 1108 based on the first probability that corresponds to the first value, or (e.g., if the user device received a new barring factor value from the RAN) based on a second probability that corresponds to a second value of the barring factor.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for applying access control through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method, in a user device, for avoiding undesired message transmissions from the user device to a radio access network (RAN), wherein the RAN is configured to transmit a barring factor with any one of a plurality of values, and wherein the plurality of values correspond to different probabilities that the user device will be barred from transmitting at least some messages to the RAN, the method comprising: receiving, from the RAN, a first value of the barring factor; determining, by processing hardware of the user device and based on a first probability corresponding to the first value, that access barring applies to a message transmission; and after determining that the access barring applies to the message transmission, and by the processing hardware, either (a) if the first value does not correspond to a maximum probability of the different probabilities, (i) suspending the message transmission while running a first timer, and (ii) determining that the access barring is alleviated after the first timer expires or stops, or (b) if the first value corresponds to the maximum probability, either (i) denying the message transmission, or (ii) suspending the message transmission at least until an occurrence of at least one event in a set of one or more predefined events.

Aspect 2. The method of aspect 1, wherein the first value corresponds to the maximum probability, and wherein the method comprises: after determining that the access barring applies to the message transmission, suspending the message transmission at least until the occurrence of the predefined event.

Aspect 3. The method of aspect 3, wherein the set of one or more predefined events includes: the user device entering a particular state; the user device receiving a particular message from a core network or the RAN; the user device selecting or reselecting to a base station of the RAN; or the user device being handed over from a first base station of the RAN to a second base station of the RAN.

Aspect 4. The method of aspect 11, wherein the at least one event includes the user device receiving a second value of the barring factor from the RAN, and wherein the method further comprises: receiving the second value of the barring factor from the RAN; and determining, by the processing hardware, whether the second value corresponds to the maximum probability.

Aspect 5. The method of aspect 4, wherein the method further comprises, after determining whether the second value corresponds to the maximum probability, and by the processing hardware, either: if the second value does not correspond to the maximum probability, determining that the access barring is alleviated; or if the second value corresponds to the maximum probability, continuing to suspend the message transmission at least until (i) another occurrence of the at least one event or (ii) an occurrence of one or more additional events of the set of predefined events.

Aspect 6. The method of aspect 4, wherein the method further comprises, after determining whether the second value corresponds to the maximum probability, and by the processing hardware, either: (a) if the second value does not correspond to the maximum probability, (i) continuing to suspend the message transmission while running the first timer or a second timer, and (ii) determining that that the access barring is alleviated after the first timer or the second timer expires or stops; or (b) if the second value corresponds to the maximum probability, continuing to suspend the message transmission at least until (i) another occurrence of the at least one event or (ii) an occurrence of one or more additional events of the set of predefined events.

Aspect 7. The method of aspect 4, wherein the method further comprises, after determining whether the second value corresponds to the maximum probability, and by the processing hardware, either: (a) if the second value does not correspond to the maximum probability, determining, based on a second probability corresponding to the second value, whether the access barring still applies to the message transmission; or (b) if the second value corresponds to the maximum probability, continuing to suspend the message transmission at least until (i) another occurrence of the at least one event or (ii) an occurrence of one or more additional events of the set of predefined events.

Aspect 8. The method of aspect 1, wherein the method comprises, after determining that the access barring applies to the message transmission, either: (a) if the first value does not correspond to the maximum probability, (i) suspending the message transmission while running the first timer, and (ii) determining that the access barring is alleviated after the first timer expires or stops, or (b) if the first value corresponds to the maximum probability, denying the message transmission.

Aspect 9. The method of aspect 1, comprising: in response to determining that the access barring applies to the message transmission, setting an access barring flag; suspending the message transmission at least until the occurrence of the at least one event; receiving a second value of the access barring factor from the RAN; after receiving the second value of the access barring factor, determining that the access barring flag is set; and in response to determining that the access barring flag is set, determining whether the access barring is alleviated.

Aspect 10. The method of aspect 1, wherein the barring factor and the message transmission are both specifically associated with a particular access category.

Aspect 11. The method of aspect 1, wherein determining that access barring applies to the message transmission includes: generating a random number based on a uniform probability distribution; and determining that the access barring applies to the message transmission based on the random number and the first probability.

Aspect 12. The method of aspect 1, wherein receiving the first value of the barring factor includes receiving the first value in a system information message that is broadcast by the RAN.

Aspect 13. The method of aspect 1, wherein the first value does not correspond to the maximum probability, and wherein the method comprises: after determining that the access barring applies to the message transmission, suspending the message transmission while running the first timer; determining that the access barring is alleviated after the first timer expires or stops.

Aspect 14. The method of aspect 13, further comprising: in response to determining that the access barring is alleviated, sending a first inter-protocol layer (IPL) message indicating that the message transmission is permitted from a radio resource control (RRC) entity of the user device to a non-access stratum (NAS) entity of the user device.

Aspect 15. The method of aspect 14, further comprising: in response to receiving the first IPL message, determining, by the NAS entity, that the message transmission is still needed; sending a second IPL message indicating that the message transmission is still needed from the NAS entity to the RRC entity; and in response to the RRC entity receiving the second IPL message, transmitting a message associated with the message transmission to the RAN.

Aspect 16. A method, in a user device, for avoiding undesired message transmissions from the user device to a radio access network (RAN), wherein the RAN is configured to transmit a barring factor with any one of a plurality of values, and wherein the plurality of values correspond to different probabilities that the user device will be barred from transmitting at least some messages to the RAN, the method comprising: receiving, from the RAN, a first value of the barring factor; determining, by processing hardware of the user device, whether the first value corresponds to a maximum probability of the different probabilities; and by the processing hardware, either (a) if the first value does not correspond to the maximum probability, determining, based on a first probability corresponding to the first value, whether temporary access barring applies to a message transmission, or (b) if the first value corresponds to the maximum probability, denying the message transmission.

Aspect 17. The method of aspect 16, wherein: determining whether the first value corresponds to the maximum probability includes determining that the first value does not correspond to the maximum probability; the method comprises determining, based on the first probability, whether the temporary access barring applies to the message transmission; and the method further comprises, after determining whether the temporary access barring applies to the message transmission, either (a) in response to determining that the temporary access barring applies to the message transmission, (i) suspending, by the processing hardware, the message transmission while running a first timer, and (ii) determining, by the processing hardware, that the temporary access barring is alleviated after the first timer expires or stops; or (b) in response to determining that the temporary access barring does not apply to the message transmission, transmitting a message associated with the message transmission to the RAN.

Aspect 18. The method of aspect 16, wherein the barring factor and the message transmission are both specifically associated with a particular access category.

Aspect 19. The method of aspect 16, wherein determining whether the temporary access barring applies to the message transmission includes: generating a random number based on a uniform probability distribution; and determining that the access barring applies to the message transmission based on the random number and the first probability.

Aspect 20. The method of aspect 16, wherein receiving the first value of the barring factor includes receiving the first value in a system information message that is broadcast by the RAN.

Aspect 21. A method, in a user device, for avoiding undesired message transmissions from the user device to a radio access network (RAN), wherein the RAN is configured to transmit a barring factor with any one of a plurality of values, and wherein the plurality of values correspond to different probabilities that the user device will be barred from transmitting at least some messages to the RAN, the method comprising: receiving, from the RAN, a first value of the barring factor; determining, by processing hardware of the user device and based on a first probability corresponding to the first value, that access barring applies to a message transmission; suspending, by the processing hardware, the message transmission while running a timer; after the timer expires or stops, determining, by the processing hardware, that the message transmission is still needed; and in response to determining that the message transmission is still needed, determining, by the processing hardware and based on either (i) the first probability or (ii) a second probability corresponding to a second value of the barring factor received from the RAN, whether the access barring still applies to the message transmission.

Aspect 22. The method of aspect 21, further comprising: in response to the timer expiring or stopping, determining that the access barring is alleviated; and in response to determining that the access barring is alleviated, sending a first inter-protocol layer (IPL) message indicating that the message transmission is permitted from a radio resource control (RRC) entity of the user device to a non-access stratum (NAS) entity of the user device, wherein determining that the message transmission is still needed is performed by the NAS entity and occurs in response to the NAS entity receiving the first IPL message.

Aspect 23. The method of aspect 21, wherein determining whether the access barring still applies to the message transmission includes determining that the access barring still applies to the message transmission, and wherein the method further comprises: in response to determining that the access barring still applies to the message transmission, transmitting a message associated with the message transmission to the RAN.

Aspect 24. The method of aspect 21, wherein the barring factor and the message transmission are both specifically associated with a particular access category.

Aspect 25. The method of aspect 21, wherein determining that the access barring applies to the message transmission includes: generating a random number based on a uniform probability distribution; and determining that the access barring applies to the message transmission based on the random number and the first probability.

Aspect 26. The method of aspect 21, wherein receiving the first value of the barring factor includes receiving the first value in a system information message that is broadcast by the RAN.

Aspect 27. A user device comprising processing hardware configured to execute a method according to any one of the preceding aspects.

What is claimed is:

1. A method, in a user device, for avoiding undesired message transmissions from the user device to a radio access network (RAN), wherein the RAN is configured to transmit a barring factor with any one of a plurality of values, and wherein the plurality of values correspond to different probabilities that the user device will be barred from transmitting at least some messages to the RAN, the method comprising:
receiving, from the RAN, a first value of the barring factor;
determining, by processing hardware of the user device and based on a first probability corresponding to the first value, that access barring applies to a message transmission;
suspending, by the processing hardware, the message transmission while running a first timer; and
after the first timer expires or stops, and by the processing hardware, either
if the first value does not correspond to a maximum probability of the different probabilities, determining that the access barring is alleviated, or
if the first value corresponds to the maximum probability, continuing to suspend the message transmission.

2. The method of claim 1, wherein the first value corresponds to the maximum probability, and wherein the method comprises, after the first timer expires or stops:
either restarting the first timer or starting a second timer; and
continuing to suspend the message transmission at least until the restarted first timer or the second timer expires or stops.

3. The method of claim 1, wherein the first value corresponds to the maximum probability, and wherein the method comprises, after the first timer expires or stops:
continuing to suspend the message transmission at least until the user device receives, from the RAN, a different, second value of the barring factor.

4. The method of claim 1, wherein the first value corresponds to the maximum probability, and wherein the method comprises, after the first timer expires or stops:
continuing to suspend the message transmission at least until the user device selects or reselects to a base station of the RAN.

5. The method of claim 1, wherein the first value corresponds to the maximum probability, and wherein the method comprises, after the first timer expires or stops:
continuing to suspend the message transmission at least until the user device is handed over from a first base station of the RAN to a second base station of the RAN.

6. The method of claim 1, wherein the first value corresponds to the maximum probability, and wherein the method comprises, after the first timer expires or stops:
continuing to suspend the message transmission at least until the user device enters a particular state.

7. The method of claim 6, wherein the particular state is one of RRC_IDLE, RRC_INACTIVE, or RRC_CONNECTED.

8. The method of claim 1, wherein the barring factor and the message transmission are both specifically associated with a particular access category.

9. The method of claim 1, wherein determining that access barring applies to the message transmission includes:
generating a random number based on a uniform probability distribution; and
determining that the access barring applies to the message transmission based on the random number and the first probability.

10. The method of claim 1, wherein receiving the first value of the barring factor includes receiving the first value in a system information message that is broadcast by the RAN.

11. The method of claim 1, wherein the first value does not correspond to the maximum probability, and wherein the method comprises, after the first timer expires or stops:
determining that the access barring is alleviated; and
in response to determining that the access barring is alleviated, sending a first inter-protocol layer (IPL) message indicating that the message transmission is permitted from a radio resource control (RRC) entity of the user device to a non-access stratum (NAS) entity of the user device.

12. The method of claim 11, further comprising:
in response to receiving the first IPL message, determining, by the NAS entity, that the message transmission is still needed;
sending a second IPL message indicating that the message transmission is still needed from the NAS entity to the RRC entity; and
in response to the RRC entity receiving the second IPL message, transmitting a message associated with the message transmission to the RAN.

13. A user device comprising processing hardware configured to:
receive, from a radio access network (RAN) configured to transmit a barring factor with any one of a plurality of values, a first value of the barring factor, wherein the plurality of values correspond to different probabilities that the user device will be barred from transmitting at least some messages to the RAN;
determine, based on a first probability corresponding to the first value, that access barring applies to a message transmission;
suspend the message transmission while running a first timer; and
after the first timer expires or stops, either
if the first value does not correspond to a maximum probability of the different probabilities, determine that the access barring is alleviated, or
if the first value corresponds to the maximum probability, continue to suspend the message transmission.

14. The user device of claim 13, wherein the first value corresponds to the maximum probability, and wherein the processing hardware is configured to, after the first timer expires or stops:
either restart the first timer or start a second timer; and
continue to suspend the message transmission at least until the restarted first timer or the second timer expires or stops.

15. The user device of claim 13, wherein the first value corresponds to the maximum probability, and wherein the processing hardware is configured to, after the first timer expires or stops:
continue to suspend the message transmission at least until the user device receives, from the RAN, a different, second value of the barring factor.

16. The user device of claim 13, wherein the first value corresponds to the maximum probability, and wherein the processing hardware is configured to, after the first timer expires or stops:
continue to suspend the message transmission at least until the user device is handed over from a first base station of the RAN to a second base station of the RAN.

17. The user device of claim 13, wherein the first value corresponds to the maximum probability, and wherein the processing hardware is configured to, after the first timer expires or stops:
continue to suspend the message transmission at least until the user device enters a particular state, the particular state being one of RRC_IDLE, RRC_INACTIVE, or RRC_CONNECTED.

18. The user device of claim 13, wherein the barring factor and the message transmission are both specifically associated with a particular access category.

19. The user device of claim 13, wherein determining that access barring applies to the message transmission includes:
generating a random number based on a uniform probability distribution; and
determining that the access barring applies to the message transmission based on the random number and the first probability.

20. The user device of claim 13, wherein the first value does not correspond to the maximum probability, and wherein the processing hardware is configured to, after the first timer expires or stops:
determine that the access barring is alleviated; and
in response to determining that the access barring is alleviated, send a first inter-protocol layer (IPL) message indicating that the message transmission is permitted from a radio resource control (RRC) entity of the user device to a non-access stratum (NAS) entity of the user device.

21. The user device of claim 20, wherein the processing hardware is configured to:
in response to receiving the first IPL message, determine, by the NAS entity, that the message transmission is still needed;
send a second IPL message indicating that the message transmission is still needed from the NAS entity to the RRC entity; and
in response to the RRC entity receiving the second IPL message, transmit a message associated with the message transmission to the RAN.

22. The user device of claim 13, wherein the first value corresponds to the maximum probability, and wherein the processing hardware is configured to, after the first timer expires or stops:
continue to suspend the message transmission at least until the user device selects or reselects to a base station of the RAN.

* * * * *